United States Patent [19]

Watanabe et al.

[11] Patent Number: 4,722,916
[45] Date of Patent: Feb. 2, 1988

[54] LOW EXPANSION CERAMICS AND METHOD OF PRODUCING THE SAME

[75] Inventors: Keiichiro Watanabe, Nagoya; Tadaaki Matsuhisa, Kasugai, both of Japan

[73] Assignee: NGK Insulators, Ltd., Japan

[21] Appl. No.: 861,703

[22] Filed: May 12, 1986

[30] Foreign Application Priority Data

May 14, 1985 [JP] Japan .................. 60-102385
May 14, 1985 [JP] Japan .................. 60-102386

[51] Int. Cl.⁴ ............... C04B 35/18; C04B 35/20
[52] U.S. Cl. ................. 501/118; 501/119; 501/122; 501/9; 156/663
[58] Field of Search ............ 501/118, 119, 122, 9; 156/663

[56] References Cited

U.S. PATENT DOCUMENTS

| | | | |
|---|---|---|---|
| 3,881,944 | 5/1975 | Beall et al. | 501/9 X |
| 3,885,977 | 5/1975 | Lachman et al. | 501/80 |
| 3,958,058 | 5/1976 | Elmer | 501/9 X |
| 4,295,892 | 10/1981 | Matsuhisa et al. | 501/119 X |
| 4,540,671 | 9/1985 | Kondo et al. | 501/9 |

FOREIGN PATENT DOCUMENTS

| | | | |
|---|---|---|---|
| 2411757 | 10/1974 | Fed. Rep. of Germany | 501/119 |
| 55-144468 | 11/1980 | Japan | 501/119 |
| 59-92943 | 5/1984 | Japan . | |
| 409998 | 1/1974 | U.S.S.R. | 501/119 |

Primary Examiner—Mark L. Bell
Assistant Examiner—A. Knab
Attorney, Agent, or Firm—Parkhurst & Oliff

[57] ABSTRACT

Cordierite series dense and low expansion ceramics have excellent thermal shock resistance property, being airtight, heat resistant and having high dimensional stability at high temperatures can be achieved by incorporating 2–10% by weight of $P_2O_5$ in the cordierite ceramic and acid treating the fired or sintered body to selectively remove $P_2O_5$ to primarily result in an amount of 0.1% by weight of $P_2O_5$ remaining in the sintered body.

10 Claims, 20 Drawing Figures

FIG_4

100 μm

100 μm

100 μm

FIG_11

100 μm

FIG_16

100μm

100μm

LOW EXPANSION CERAMICS AND METHOD OF PRODUCING THE SAME

BACKGROUND OF THE INVENTION

1. Field of the Invention

The present invention relates to low expansion ceramics, more particularly cordierite series dense, low expansion ceramics having excellent thermal shock resistance, being airtight and being heat resistant.

2. Related Art Statement

Recently, accompanying the rapid progress in industrial technologies, demand for industrial materials having superior heat resistance and thermal shock resistance have increased. Thermal shock resistance of ceramics is influenced by thermal expansion coefficient, thermal conductivity, strength, elastic modulus, Poisson's ratio, etc. of ceramics, by shape and size of products, and further by heating or cooling conditions of ceramics, namely, heat transfer rate of the ceramics.

It has been known that thermal shock resistance of ceramics is influenced largely by thermal expansion coefficient among the aforementioned factors, and largely dependent exclusively on thermal expansion coefficient especially when heat transfer rate of the ceramics is large. Therefore, it has been desired to develop low expansion ceramics having excellent thermal shock resistance.

Heretofore, cordierite has been known as a ceramic substance of relatively low expansion. However, it is generally difficult to produce a dense body by sintering. Particularly, when it is desired to produce low expansion cordierite of an average thermal expansion coefficient of not greater than $2.0 \times 10^{-6}/°C$. in a temperature range of from ambient to 800° C., it has been necessary to restrict the amount of impurities such as calcia, alkaline earths, potassium, sodium and the like which acts as a flux in producing the cordierite to a much minor amount, so that the resultant cordierite has a very small amount of glass phase and is very porous. Particularly, cordierite honeycomb structures, such as those of U.S. Pat. No. 4,295,892 to Matsuhisa et al, which have recently been widely used as substrates for catalysts for purifying exhaust gas of automobiles necessitate an average thermal expansion coefficient of not greater than $1.5 \times 10^{-6}/°C$. in a temperature range of from ambient to 800° C., so that a raw material such as talc, kaoline, alumina or the like raw material of a low impurity or flux content is used. As a result, open porosity of the produced cordierite is 25–45% at the minimum.

Accordingly, if such cordierite ceramics are used, for instance, as a honeycomb structural body for a regenerator type heat exchanger, the honeycomb body has such a large open porosity that the pores, particularly the communicated pores, on the partition walls which define the holes of the honeycomb structure, incurs leakage of fluids between a heating fluid and a heat recovery fluid from either side of the fluids. Hence, serious drawbacks occur that efficiency of the heat exchanger and efficiency of the total system wherein the heat exchanger is used becomes inferior. While, if such cordierite of high open porosity is used e.g. as a housing for a turbocharger or an exhaust manifold of an engine, a serious drawback occurs that the interior air of high pressure leaks to the exterior of the manifold etc. because of the high open porosity. Therefore, it has been desired to develop dense and low expansion cordierite ceramics having splendid thermal shock resistance.

Moreover, for structural materials which are exposed to such high temperatures, dimensional stability at high temperatures has been desired which is within ±0.05% in practical use.

Hitherto, for obtaining a dense cordierite ceramic, a method has been known wherein a batch of composition for preparation of cordierite is melted, molded and subjected to a crystallization treatment to obtain glass ceramics. For example, the report of Topping and Murthy described on Journal of the Canadian Ceramic Society, 46, 1977 proposed to substitute $AlPO_4$ for $SiO_2$ in cordierite in an amount of 20% by weight at the maximum. According to the report, a composition of main components of raw materials added with $AlPO_4$ is melted and cooled to form cordierite glass, and reheated and cooled to produce cordierite crystals. The thus obtained cordierite is dense. However, the cordierite has a drawback of still large thermal expansion coefficient of $2.15 \times 10^{-6}/°C$. at the minimum, because orientation of precipitated cordierite crystal phases was unable to be controlled.

Japanese patent application laid open Nos. 59-13,741 and 59-92,943 proposed crystallized glass bodies produced by preparing compositions of main components of raw materials containing $Y_2O_3$ or ZnO added with $B_2O_3$ and/or $P_2O_5$, firing the compositions to produce crystallized glass components, pulverizing or grinding the crystallized glass components to form glass frits of 2–7 $\mu$m, forming or molding the glass frits to a desired shape, and refiring the shaped glass frits to obtain the crystallized glass bodies which, however, has a drawback of large thermal expansion coefficients of $2.4$–$2.6 \times 10^{-6}/°C$.

U.S. Pat. No. 3,885,977 "Anisotropic cordierite monolith" issued on May 27, 1975 to I. M. Lachman et al disclosed a low expansion cordierite ceramic wherein crystal phases of cordierite ceramics are oriented in a plane due to the use of planar clay or laminated clay in raw materials for the cordierite ceramics. The cordierite glass ceramic is dense, however, it has a drawback of still high thermal expansion coefficient of $2.0 \times 10^{-6}/°C$. or more.

Moreover, the prior art is silent regarding mentioned dimensional stability when held at high temperatures for a long time.

SUMMARY OF THE INVENTION

Therefore, an object of the present invention is to obviate the above drawbacks of the prior art.

Another object of the present invention is to provide a dense and low expansion ceramic without vitrifying the ceramic.

Still another object of the present invention is to provide dense and low expansion cordierite series ceramics of a low open porosity of 25% by volume or less and an average thermal expansion coefficient in a temperature range of 25°–800° C. (abbreviated as "CTE", hereinafter) of $2.0 \times 10^{-6}/°C$. or less.

A further object of the present invention is to provide a method of producing such dense and low expansion cordierite series ceramics of low open porosity.

A still further object of the present invention is to provide dense and low expansion cordierite series ceramics of low open porosity of 25% by volume or less and CTE of $2.0 \times 10^{-6}/°C$. or less and high dimensional stability, i.e., a low dimensional change of ±0.05% or less when held at a temperature of 500°–1,200° C. for 1,000 hrs.

Another object of the present invention is to provide a method of producing such dense and low expansion cordierite series ceramics of low open porosity and high dimensional stability at prolonged high temperatures.

The present invention is a low expansion ceramic characterized by having a chemical composition comprising 8.0–20.5% by weight of MgO, 24.0–45.0% by weight of $Al_2O_3$, 40.5–61.0% by weight of $SiO_2$ and less than 2% by weight of $P_2O_5$, a main crystal phase consisting of cordierite phases, an open porosity of 25% by volume or less and a CTE of $2.0 \times 10^{-6}/°C$. or less.

In preferred embodiments of the present invention, the ceramics have CTE of $1.0 \times 10^{-6}/°C$. or less.

In some embodiments of the present invention, the ceramics have a dimensional change of ±0.05% when held at a temperature of 500°–1,200° C. for 1,000 hrs.

Total pore volume of pores of diameters of 5 μm or more (abbreviated as "TVP of +5 μm", hereinafter) is usually about 0.06 cc/g or less in the present ceramic.

The low expansion ceramic of the present invention is produced by preparing a batch of raw materials having a chemical composition comprising 7.5–20% by weight of MgO, 22.0–44.3% by weight of $Al_2O_3$, 37.0–60.0% by weight of $SiO_2$ and 2.0–10.0% by weight of $P_2O_5$, shaping or forming the prepared batch to a shaped body of a desired shape by a shaping treatment such as cast molding including slip casting etc., plastic molding including extrusion molding etc., press forming, and the like, drying the shaped body, firing or sintering the dried shaped body, and acid treating the sintered body to selectively remove mainly $P_2O_5$ from the sintered body.

Preferably, the firing is effected at 1,250°–1,450° C. for 2–20 hrs. If the firing temperature is below 1,250° C., the cordierite phases are not formed sufficiently, while if the firing temperature is above 1,450° C. the sintered body is softened and deformed. Though the formation of the cordierite phases depends largely on the firing temperature, the cordierite phases are not formed sufficiently if the firing time is less than 2 hrs. While, if the firing time exceeds 20 hours, the sintered body is liable to soften and deform depending on the firing temperature.

In one embodiment of the present invention, the acid treated body is heat treated at a temperature of 1,150° C.—the firing temperature to heal the defects formed in the sintering body by the acid treatment, thereby to diminish the dimensional change when held at 500°–1,200° C. for 1,000 hrs. to not greater than ±0.05%.

$P_2O_5$ contained in the raw materials of cordierite series ceramic is converted to $AlPO_4$ during the firing of the raw materials, and substitutes a part of $SiO_2$ in the cordierite crystals to form a cordierite series solid solution having a m.p. which is slightly lower than that of unsubstituted cordierite ceramic. As a result, the amount of the liquid phase produced during the firing or sintering is increased, so that dense cordierite is easily produced. Moreover, most portion of the liquid phase is crystallized in the cordierite series solid solution during the cooling followiing the sintering, so that CTE is not increased. This is a difference from those cordierite ceramics wherein calcia, alkaline earths, potassium, sodium or the like flux is added to densify the cordierite ceramics. In addition, the raw materials can be selected from talc, clay, alumina, bluesite, magnesite, aluminum hydroxide and the like that are used for producing conventional cordierite ceramics, so as to orient the cordierite crystals in the ceramic, so that dense and low expansion ceramics of cordierite series ceramics can be obtained with low CTE of $2.0 \times 10^{-6}/°C$. or less.

In addition, if the acid treated ceramic is heat treated at a temperature of 1,150° C.—the firing temperature, the defects formed in the sintered body by the acid treatment are healed, so that the dimensional change of the heat treated ceramic is lessened to a small value of ±0.05% or less even when it is held in a prolonged thermal usage condition of 500°–1,200° C. for 1,000 hrs.

Though $P_2O_5$ added in the raw materials combines with $Al_2O_3$ to form $AlPO_4$ when firing the raw materials, $AlPO_4$ can not be detected by analysis and the amount of $P_2O_5$ can be detected by analysis of the fired raw materials as well as the amount of $Al_2O_3$.

Mg in the cordierite phase of the dense and low expansion ceramic can be replaced or substituted partially by Zn and/or Fe by 10 mol % at the maximum to provide other useful cordierite phases such as iron cordierite, zinc cordierite or iron zinc cordierite which fall within the scope of the present invention.

$P_2O_5$ source material is preferably selected from the group consisting of aluminum phosphate, magnesium phosphate, zinc phosphate, iron phosphate and combinations thereof.

MgO source material, $Al_2O_3$ source material and $SiO_2$ source material are preferably selected mainly from the group consisting of bluesite, magnesite, talc, clay, alumina and aluminum hydroxide. Further, magnesium oxide, silica etc. can be included in the group.

If the MgO source material such as blusite, magnesite, talc and the like having an average particle diameter of not greater than 5 μm is used in the raw materials, dense cordierite series ceramics of sufficiently airtight property can be obtained wherein the diameter of the remaining open pores are suppressed to not greater than 5 μm and the open porosity is not greater than 25% by volume.

The present invention is based on a novel finding that dense and low expansion cordierite series ceramics of low open porosity of 25% by volume or less and low CTE of $2.0 \times 10^{-6}/°C$. or less can be obtained by solid solving 2–10% by weight of $P_2O_5$ in cordierite phases to convert $P_2O_5$ to $AlPO_4$ by firing, and acid treating the fired or sintered body of open porosity of 15% by volume or less to selectively remove mainly $P_2O_5$ from the sintered body to a low $P_2O_5$ content of less than 2% by weight. The present invention is also based on a novel finding that dense and low expansion ceramics of dimensional change of ±0.05% or less when held at a temperature of 500°–1,200° C. for 1,000 hrs. can be obtained by heat treating the acid treated sintered body at a temperature of 1,150° C.—the firing temperature for a time sufficient to heal the defects formed in the sintered body by the acid treatment. The lower limit of $P_2O_5$ of 2% by weight in the raw materials is because sufficient amount of liquid phase for densifying the cordierite ceramics, is not produced, so that dense cordierite series ceramics can not be obtained, if the amount of $P_2O_5$ is below the lower limit. The upper limit of $P_2O_5$ of 10% by weight in the raw materials is because excessive amount of $P_2O_5$ tresspasses a solid soluble extent permissible for converting $P_2O_5$ to $AlPO_4$ in the cordierite, so that highly expansive cordierite series ceramics are produced.

The reason why the dimensional change of the cordierite series ceramics when held at 500°-1,200° C. for 1,000 hrs. is defined to not over than ±0.05% is because the cordierite series ceramics can not be used practically as mechanical parts for high temperature use, if the dimensional change exceeds the defined value.

The reason for defining the chemical composition of the batch of the raw materials of the cordierite series ceramics to the range as mentioned above is because cordierite phases are not produced sufficiently, so that highly expansive cordieirte ceramics are produced, if the chemical composition of the batch is beyond the range specified above. The reason of selectively removing $P_2O_5$ from the sintered body to the low $P_2O_5$ content of less than 2% by weight by the acid treatment is because a $P_2O_5$ content of not less than 2% by weight can not achieve the desired sufficient low expansion effect of the ceramics.

The reason for defining the chemical composition of the cordierite series ceramics after acid treatment to the range as mentioned above is because otherwise the proposed dense and low expansion ceramics having an open porosity of 25% by volume or less and a CTE of $2.0 \times 10^{-6}$/°C. or less are not provided.

TVP of $+5$ $\mu m$ is usually restricted to 0.06 cc/g or less, because leakage of pressurized gas depends on TVP of $+5$ $\mu m$, and leakage of the cordierite series ceramics can be reduced to half or less than that of conventional cordierite by restricting TVP of $+5$ $\mu m$ to 0.06 cc/g or less.

Mg in the cordierite phase $2MgO.2Al_2O_3.5SiO_2$ of the ceramics can be substituted or replaced partially by Zn and/or Fe by 10 mol % at the maximum, because such substitution affords cordierite series ceramics of properties of substantially equal to the cordierite series ceramics of the present invention.

The reason for limiting the heat treatment temperature to 1,500° C.—the firing temperature is because at less than 1,150° C. the defects formed in the sintered body by the acid treatment are not easily healed, while at more than the firing temperature sintering occurs and microstructure of the ceramics changes widely so that the desired properties can not be achieved.

The reason for selecting $P_2O_5$ source from the group consisting of aluminum phosphate, magnesium phosphate, zinc phosphate, iron phosphate and mixtures thereof is because phosphoric acid is liquid so that it is difficult to mix and homogeneous mixture results. Besides, phosphoric acid causes the ceramic materials to locally melt at low temperatures below the formation temperature of cordierite thereby to produce macro pores, so that it is preferably be added in the aforementioned form of water-insoluble phosphates of relativey higher melting points in the raw materials.

The reason for selecting MgO source material, $Al_3O_3$ source material and $SiO_2$ source material from the group consisting of bluesite, magnesite, talc, clay, alumina and aluminum hydroxide is because the cordierite series ceramics produced from these raw materials are particularly low expansive. Further, magnesium oxide for the MgO source material, silica and the like material for the $SiO_2$ source material can be included in the group by the same reason.

Average particle diameter of MgO source material is restricted to 5 $\mu m$ or less, because the cordierite series ceramics produced by sintering have remaining pores in the skeleton of MgO source material particles, which skeleton pores become a cause of open pores, so that such restriction can suppress the formation of open pores of diameters of more than 5 $\mu m$ and the purposed highly airtight cordierite series ceramics can be obtained.

BRIEF DESCRIPTION OF THE DRAWINGS

For a better understanding of the present invention, reference is made to the accompanying drawings, in which.

DESCRIPTION OF THE PREFERRED EMBODIMENTS

Hereinafter, the present invention will be explained in more detail with reference to examples, in which "parts" refers to parts by weight unless otherwise specified.

Examples 1-13 and Referential Examples 1-10

Raw materials blusite, magnesite, talc, alumina, aluminum hydroxide, clay, aluminum phosphate, magnesium phosphate and iron phosphate are measured and mixed according to the amounts shown in the later-described Table 1. Particles of the raw materials were preliminarily adjusted to desired sizes. Chemical analysis values of the raw materials used are shown in the later-described Table 2. 100 parts of the mixture is added with 5-10 parts of water and 20 parts of starch paste (water content 80%), kneaded completely by a kneader, and extruded by a vacuum extruder to columnar bodies of 65 mm square and 120 mm length of honeycomb structure of a triangular cell shape of pitch of 1.0 mm and partition wall thickness of 0.10 mm. The honeycomb structure bodies are dried, fired at the firing conditions described in Table 1, and then acid treated with sulfuric acid, nitric acid or hydrochoric acid to obtain cordierite series ceramic honeycomb structures of Examples 1-13 and Referential Examples 1-10.

Thus obtained various cordierite series ceramic honeycomb structures of Table 1 are determined for comparison respectively for cordierite crystal contents by X-ray diffraction on powders thereof, CTE and open porosities. TVP of +5 μm are determined by mercury-urging type porosimeter. Leakage or leaked amounts of pressurized air through the thin partition walls thereof are measured in the following manner.

One end surface of the cordierite series ceramic honeycomb structure is airtightly sealed by a rubber packing of 65 mm×65 mm size with a square hole of 20 mm×20 mm at the center, and the other end surface of the honeycomb structure is airtightly sealed with a rubber packing of the same size but without the centeral square hole, and then pressurized air of pressure of 1.4 kg/cm$^2$ is introduced into the honeycomb structure through the central hole of the rubber packing to measure a flow rate of the pressurized air leaking to the exterior through unit surface area of the partition walls of the honeycomb structure per unit of time so as to express the leakage by the dimension of kg/m$^2$·sec.

Figure 1:
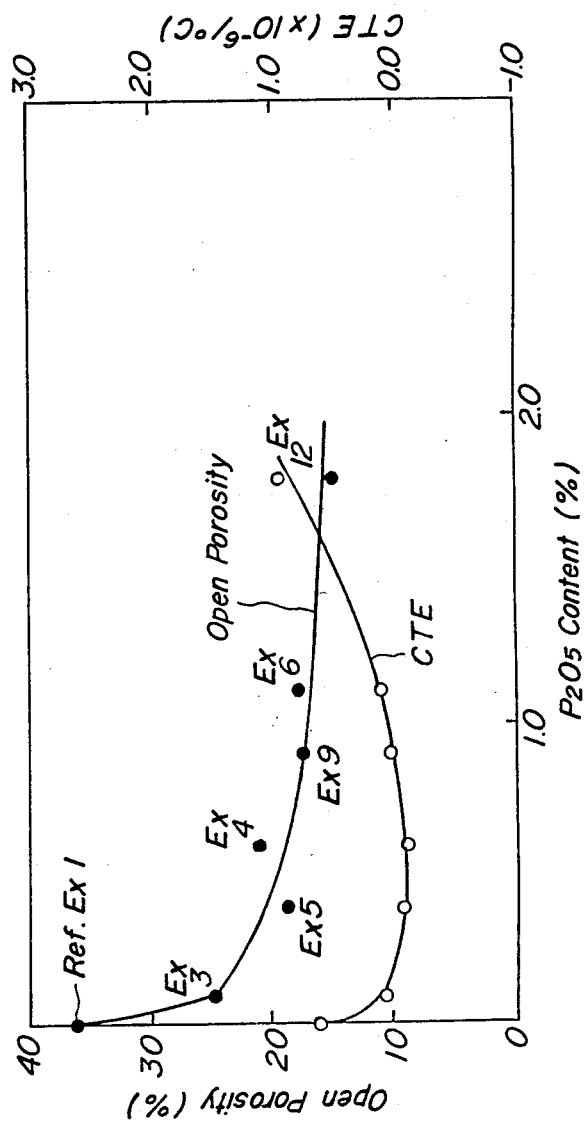
FIGS. 1 and 11 are characteristic graphs showing relations between $P_2O_5$ content and open porosity or CTE of cordierite series ceramic honeycomb structure bodies.
Figure 2:
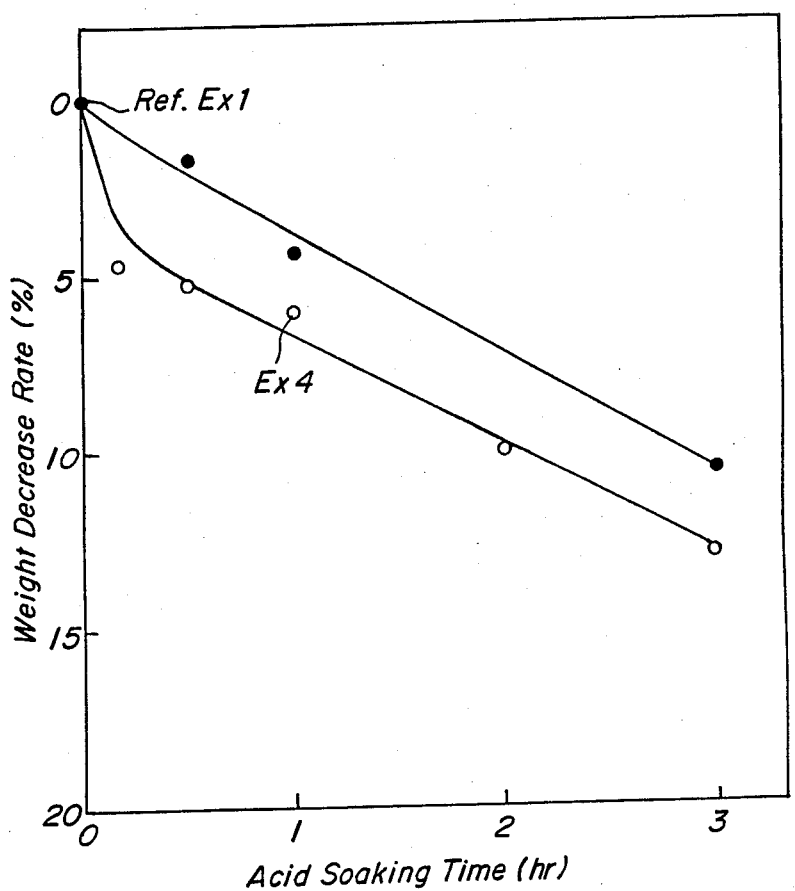
FIG. 2 is a characteristic graph showing the dependency of weight decrease in % of ceramic honeycomb structures when acid treated the honeycomb structures with 1.5N-sulfuric acid at 95° C.

The results are also shown in Table 1 and attached FIGS. 1-6 based on Table 1. FIG. 1 shows influences or effects of P$_2$O$_5$ content of the raw materials on open porosity and CTE of the product cordierite series ceramics, depicted based on the results of Table 1. Similarly, attached FIG. 2 is depicted based on the results of Table 1. In Table 1, the symbol * is for a talc raw material of an average particle diameter of 2.0 μm, the symbol ** is for talc raw materials of an average particle diameter of 10.0 μm, and those without the symbols are for talc raw materials of an average particle diameter of 5.0 μm.

TABLE 1(a)

| | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Chemical composition (wt %) | | | | | | | | | | | | | |
| MgO | 13.4 | 16.3 | 11.9 | 12.6 | 11.9 | 13.4 | 11.9 | 8.5 | 11.5 | 12.4 | 12.3 | 11.4 | 12.4 |
| Al$_2$O$_3$ | 27.5 | 27.8 | 40.2 | 35.6 | 36.7 | 27.3 | 40.1 | 38.3 | 38.4 | 44.8 | 43.1 | 39.4 | 36.2 |
| SiO$_2$ | 58.7 | 55.7 | 47.8 | 51.2 | 51.0 | 58.2 | 47.7 | 53.1 | 49.2 | 42.3 | 42.3 | 47.4 | 50.8 |
| P$_2$O$_5$ | 0.4 | 0.2 | 0.1 | 0.6 | 0.4 | 1.1 | 0.3 | 0.1 | 0.9 | 0.2 | 1.0 | 1.8 | 0.6 |
| ZnO | | | | | | | | | | | 1.3 | | |
| Fe$_2$O$_3$ | | | | | | | | | | 0.3 | | | |
| Recipe (wt %) | | | | | | | | | | | | | |
| Bluesite | | | | 8.7 | | | | | | | | | |
| Magnesite | | 8.5 | | | | | | | | | | | |
| Talc (5μ) | 37.2 | 33.0 | 19.2 | 37.0 | 35.9 | 33.1 | 38.0 | 28.9 | 33.2 | 37.5 | 36.0 | 31.2 | 37.0* |
| Alumina | 9.2 | 10.4 | 19.8 | 9.7 | 9.4 | 8.1 | 23.9 | 18.4 | 8.7 | 26.7 | 26.6 | 8.2 | 9.7 |
| Aluminum hydroxide | | | | | | | | | | 9.4 | | | |
| Clay | 50.7 | 45.2 | 48.9 | 48.3 | 46.7 | 52.2 | 29.8 | 44.6 | 43.1 | 22.1 | 24.5 | 40.6 | 48.3 |
| Aluminum phosphate | | | 3.4 | 5.0 | 8.0 | | 8.3 | 8.1 | 15.0 | | 8.1 | 20.0 | 5.0 |
| Magnesium phosphate | 2.9 | 2.9 | | | | 6.6 | | | | | | | |
| Zinc phosphate | | | | | | | | | | | 4.8 | | |
| Iron phosphate | | | | | | | | | | 4.3 | | | |

TABLE 1(b)

| | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Firing Condition | | | | | | | | | | | | | |
| Temperature (°C.) | 1,410 | 1,410 | 1,410 | 1,410 | 1,410 | 1,400 | 1,400 | 1,400 | 1,370 | 1,400 | 1,310 | 1,310 | 1,410 |
| Hrs. | 10 | 10 | 10 | 5 | 5 | 5 | 5 | 5 | 5 | 5 | 3 | 3 | 5 |
| Firing Index (SK) | 17$^1$ | 17$^1$ | 17$^1$ | 16$^5$ | 16$^5$ | 16$^4$ | 16$^4$ | 16$^4$ | 14$^5$ | 16$^4$ | 12$^5$ | 12$^5$ | 16$^5$ |
| Acid Treatment Condition | | | | | | | | | | | | | |
| Acid | hydro-chloric | nitric | nitric | sul-furic | sul-furic | sul-furic | nitric | hydro-chloric | sul-furic | sul-furic | sul-furic | sul-furic | sul-furic |
| Concentration (N) | 2.0 | 1.0 | 1.0 | 1.5 | 1.5 | 1.5 | 1.5 | 1.5 | 1.5 | 1.5 | 0.5 | 1.5 | 2.0 |
| Temperature (°C.) | 80 | 95 | 95 | 95 | 95 | 95 | 95 | 95 | 95 | 95 | 95 | 95 | 95 |
| Time (min.) | 120 | 180 | 180 | 60 | 120 | 60 | 120 | 180 | 90 | 120 | 120 | 60 | 30 |
| Weight decrease (%) | 5.3 | 7.8 | 10.3 | 6.3 | 9.9 | 7.6 | 12.9 | 15.9 | 12.8 | 10.7 | 12.0 | 11.8 | 6.0 |
| Product Properties | | | | | | | | | | | | | |
| CTE (× 10$^{-6}$/°C. in 25-800° C.) | 0.30 | 0.04 | 0.06 | −0.10 | −0.05 | 0.11 | 0.12 | 0.10 | 0.03 | 0.85 | 0.82 | 0.95 | −0.11 |

TABLE 1(b)-continued

| | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Open porosity (%) | 23.3 | 24.7 | 25.0 | 21.5 | 19.0 | 17.8 | 20.5 | 20.7 | 17.5 | 20.0 | 17.0 | 15.0 | 16.9 |
| TVP of +5 μm(cc/g) | 0.06 | — | — | 0.044 | 0.035 | 0.010 | — | — | 0.028 | — | — | 0.024 | 0.027 |
| Cordierite phase (%) | 95 | 95 | 95 | 98 | 97 | 94 | 93 | 92 | 95 | 85 | 85 | 90 | 98 |
| Leakage (kg/m$^2$ · sec at 1.4 kg/cm$^2$) | 0.110 | — | — | 0.057 | 0.024 | <0.01 | — | — | <0.01 | — | — | <0.01 | <0.01 |
| Dimensional Change (%) at 1200° C. for 1000 hrs. | — | — | — | — | −0.09 | −0.08 | — | — | — | — | — | −0.10 | −0.06 |

TABLE 1(c)

| | Referential Examples | | | | | | | | | |
|---|---|---|---|---|---|---|---|---|---|---|
| | 1 | 2 | 3 | 4 | 5 | 6 | 7 | 8 | 9 | 10 |
| Chemical Composition (wt %) | | | | | | | | | | |
| MgO | 13.8 | 13.8 | 12.6 | 13.3 | 10.3 | 21.0 | 6.0 | 13.0 | 14.1 | 12.9 |
| Al$_2$O$_3$ | 34.8 | 34.8 | 35.6 | 35.9 | 37.5 | 15.0 | 45.1 | 49.1 | 27.7 | 36.1 |
| SiO$_2$ | 51.4 | 51.4 | 51.2 | 49.6 | 38.5 | 61.1 | 46.0 | 35.0 | 56.2 | 48.1 |
| P$_2$O$_5$ | | | 0.6 | 1.2 | 13.7 | 2.9 | 2.9 | 2.9 | 2.0 | 2.9 |
| ZnO | | | | | | | | | | |
| Fe$_2$O$_3$ | | | | | | | | | | |
| Recipe (wt %) | | | | | | | | | | |
| Bluesite | | | | | | | | | | |
| Magnesite | | | | | | | | | | |
| Talc (5μ) | 39.0** | 39.0 | 37.0** | 38.2 | 27.3 | 60.9 | 17.3 | 39.4 | 37.2 | 37.0** |
| Alumina | 10.2 | 10.2 | 9.7 | 10.0 | 7.1 | 9.0 | 21.5 | 38.8 | 9.2 | 9.7 |
| Aluminum hydroxide | | | | | | | | | | |
| Clay | 50.8 | 50.8 | 48.3 | 49.8 | 35.6 | 33.4 | 56.5 | 16.9 | 50.7 | 48.3 |
| Aluminum phosphate | | | 5.0 | 2.0 | 30.0 | 4.7 | 4.7 | 4.9 | | 5.0 |
| Magnesium phosphate | | | | | | | | | 2.9 | |
| Zinc phosphate | | | | | | | | | | |
| Iron phosphate | | | | | | | | | | |

TABLE 1(d)

| | Referential Examples | | | | | | | | | |
|---|---|---|---|---|---|---|---|---|---|---|
| | 1 | 2 | 3 | 4 | 5 | 6 | 7 | 8 | 9 | 10 |
| Firing Condition | | | | | | | | | | |
| Temperature (°C.) | 1,410 | 1,410 | 1,410 | 1,410 | 1,250 | 1,410 | 1,410 | 1,410 | 1,410 | 1,410 |
| Hrs. | 5 | 5 | 5 | 5 | 3 | 5 | 5 | 5 | 10 | 5 |
| Firing Index (SK) | 16$^5$ | 16$^5$ | 16$^5$ | 16$^5$ | 10$^3$ | 16$^5$ | 16$^5$ | 16$^5$ | 17$^1$ | 16$^5$ |
| Acid Treatment Condition | | | | | | | | | | |
| Acid | non | non | sulfuric | non | non | non | non | non | non | non |
| Concentration (N) | — | — | 1.5 | — | — | — | — | — | — | — |
| Temperature (°C.) | — | — | 95 | — | — | — | — | — | — | — |
| Time (min.) | — | — | 60 | — | — | — | — | — | — | — |
| Weight decrease (%) | — | — | 6.3 | — | — | — | — | — | — | — |
| Product Properties | | | | | | | | | | |
| CTE (× 10$^{-6}$/°C. in 25–800° C.) | 0.62 | 0.61 | 0.10 | 0.65 | 5.64 | 2.15 | 2.50 | 2.32 | 1.10 | 0.68 |
| Open porosity | 36.5 | 34.6 | 21.5 | 33.7 | 1.5 | 2.7 | 3.2 | 2.5 | 13.3 | 16.1 |
| TVP of +5 μm (cc/g) | 0.073 | 0.050 | 0.073 | — | — | — | — | 0.020 | 0.040 | 0.050 |
| Cordierite phase (%) | 98 | 98 | 98 | 98 | 80 | 80 | 78 | 78 | 95 | 98 |
| Leakage (kg/m$^2$ · sec at 1.4 kg/cm$^2$) | 0.239 | 0.152 | 0.131 | — | — | — | — | <0.01 | 0.110 | 0.131 |
| Dimensional Change (%) at 1200° C. for 1000 hrs. | −0.03 | −0.03 | −0.03 | — | — | — | — | — | — | +0.99 |

TABLE 2

| | Chemical Analysis Values of Raw Materials (wt %) | | | | | | | | | | |
|---|---|---|---|---|---|---|---|---|---|---|---|
| | MgO | Al$_2$O$_3$ | SiO$_2$ | Fe$_2$O$_3$ | P$_2$O$_5$ | ZnO | Ig. loss | Na$_2$O | K$_2$O | CaO | TiO$_2$ |
| Bluesite | 62.04 | 0.16 | 0.90 | 0.08 | — | — | 34.2 | 1.41 | 0.07 | 1.14 | 1.14 |
| Magnesite | 47.11 | <0.01 | 1.13 | 0.17 | — | — | 51.37 | 0.01 | 0.02 | 0.18 | 0.18 |
| Talc | 30.90 | 1.44 | 59.95 | 1.10 | — | — | 5.7 | 0.034 | 0.009 | 0.14 | 0.14 |
| Alumina | 0.002 | 99.17 | 0.013 | 0.015 | — | — | 0.08 | 0.34 | 0.002 | 0.022 | 0.022 |
| Aluminum hydroxide | <0.01 | 65.41 | 0.02 | 0.01 | — | — | 34.33 | 0.20 | 0.01 | 0.01 | 0.01 |
| Clay | 0.56 | 29.37 | 54.36 | 1.57 | — | — | 11.42 | 0.081 | 1.12 | 0.30 | 0.30 |
| Aluminum phosphate | 0.01 | 41.86 | <0.01 | <0.01 | 55.60 | — | 2.60 | 0.03 | <0.01 | 0.01 | 0.01 |
| Magnesium phosphate | 28.86 | <0.06 | 0.16 | 0.02 | 66.53 | — | 3.69 | 0.05 | <0.01 | 0.15 | 0.15 |
| Zinc phosphate | <0.01 | 0.21 | 0.07 | <0.01 | 60.87 | 38.55 | 0.83 | 0.01 | <0.01 | <0.04 | <0.04 |

TABLE 2-continued

| | Chemical Analysis Values of Raw Materials (wt %) | | | | | | | | | | |
|---|---|---|---|---|---|---|---|---|---|---|---|
| | MgO | Al$_2$O$_3$ | SiO$_2$ | Fe$_2$O$_3$ | P$_2$O$_5$ | ZnO | Ig. loss | Na$_2$O | K$_2$O | CaO | TiO$_2$ |
| Iron phosphate | — | — | — | 43.02 | 53.01 | — | 3.70 | 0.30 | — | — | — |

As seen from the above Table 1 and attached FIG. 1, by acid treating the sintered body produced by firing the batches of the raw materials of the chemical composition comprising 7.5–20.0% by weight of MgO, 22.0–44.3% by weight of Al$_2$O$_3$, 37.0–60.0% by weight of SiO$_2$ and 2.0–10.0% by weight of P$_2$O$_5$, the low expansion ceramics of open porosities of not more than 25% by volume, CTE of not more than $2.0 \times 10^6$/°C. and the chemical composition comprising 8.0–20.5% by weight of MgO, 24.0–45.0% by weight of Al$_2$O$_3$, 40.5–61.0% by weight of SiO$_2$ and less than 2% by weight of P$_2$O$_5$ of the present invention can be obtained. Also, it can be seen from Table 1 that partial substitution of Mg in the cordierite phases by Zn or Fe can provide the low expansion ceramics of the present invention.

Figure 3:
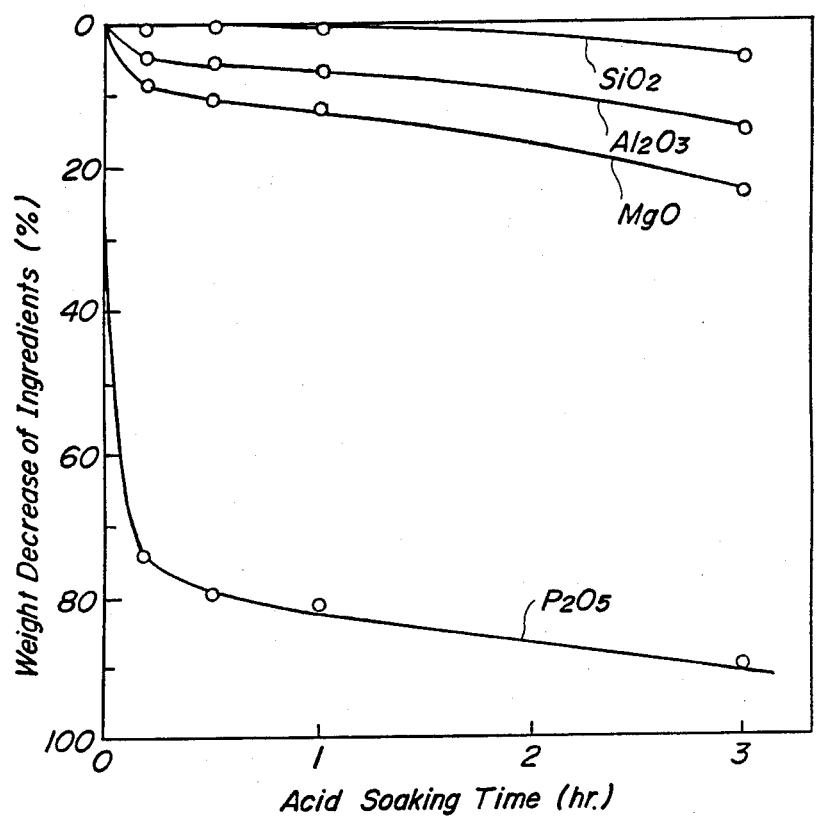
FIG. 3 is a characteristic graph showing time dependency of weight decrease rate in % of respective ingredients of the honeycomb structures when acid-treated the honeycomb structures with 1.5N-sulfuric acid at 95° C.
Figure 4:
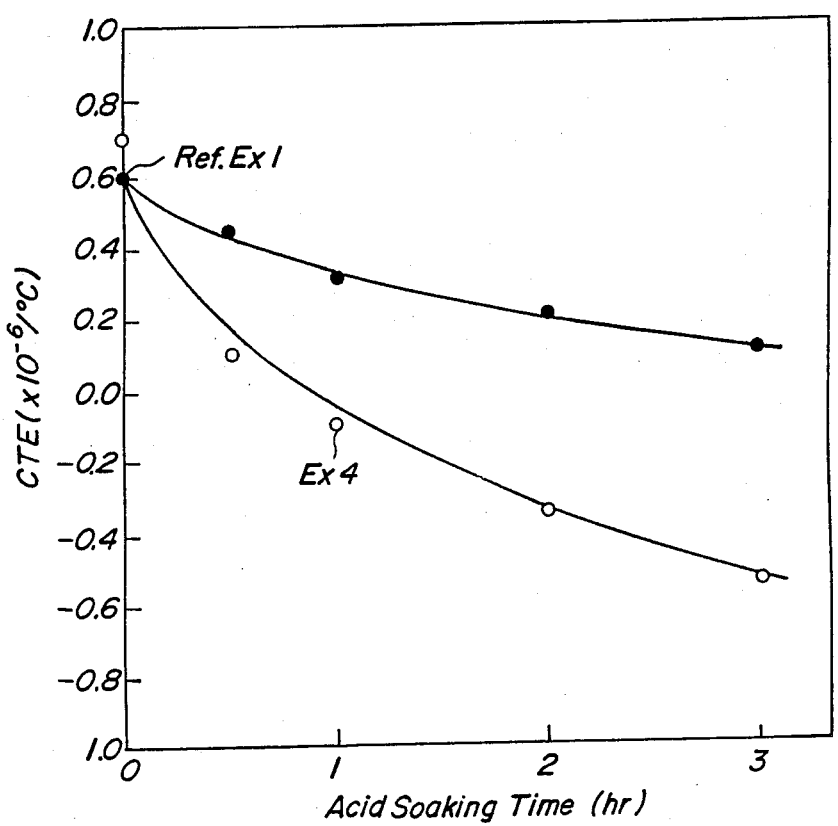
FIG. 4 is a characteristic graph showing time dependency of CTE of the honeycomb structures when acid-treated the honeycomb structures with 1.5N-sulfuric acid at 95° C.

FIG. 2 shows relations between weight decrease in % of the sintered body of the components of Example 4 and Referential Example 1 fired in the firing condition of Table 1 and treating time when treated with 1.5N-sulfuric acid at 95° C. FIG. 3 shows a relation between weight decrease rate in % of respective chemical ingredients of the sintered body of the components of Example 4 and fired in the firing condition of Table 1 and treating time when treated with 1.5N-sulfuric acid at 95° C. FIG. 4 shows relations between CTE of the sintered bodies of the recipe of Example 4 and Referential Example 1 fired in the firing conditions of Table 1 and treating time when treated with 1.5N-sulfuric acid at 95° C. As seen from FIG. 4, the fired body containing P$_2$O$_5$ according to the present invention exhibits a remarkable effect of decreasing CTE by the acid treatment than that not containing P$_2$O$_5$.

Figure 5:
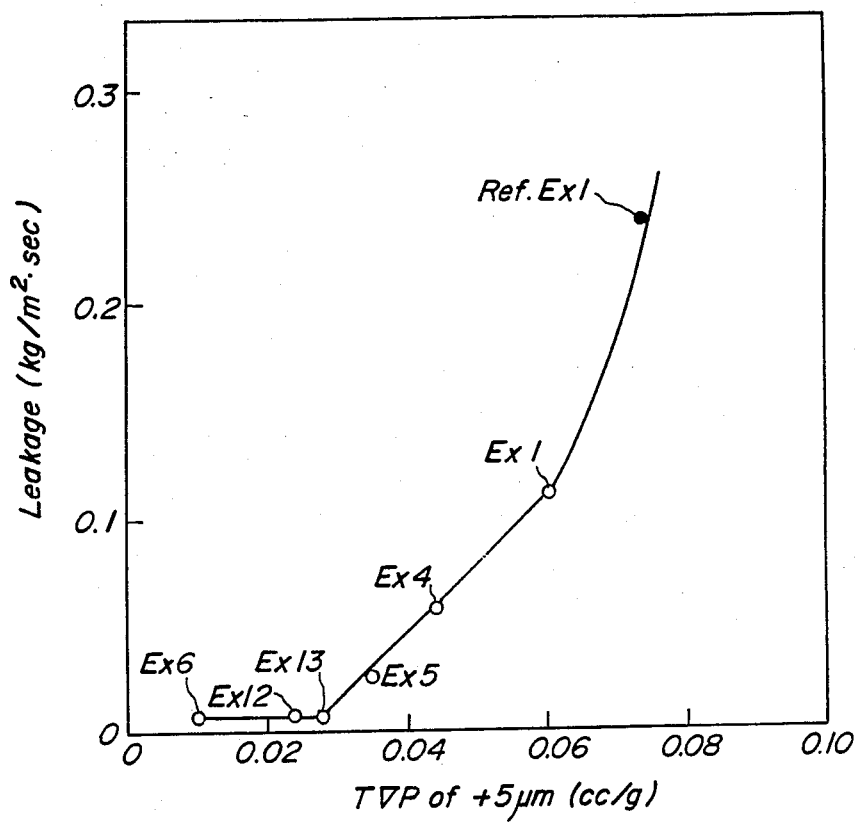
FIG. 5 is a characteristic graph showing a relation between TVP of $+5$ $\mu m$ and leakage of pressurized air of 1.4 kg/cm$^2$ through the thin partition walls of ceramic honeycomb structures.
Figure 6:
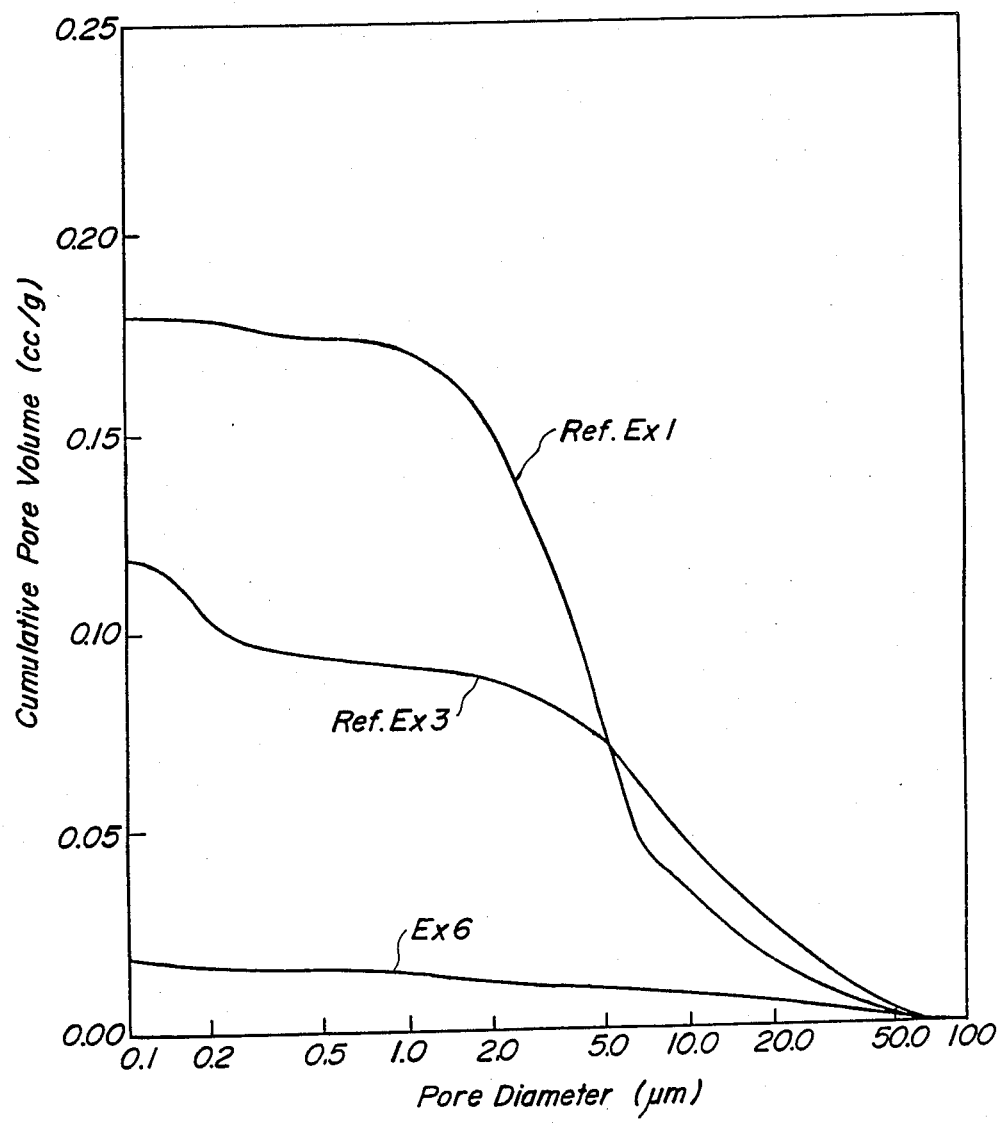
FIG. 6 is a graph showing pore diameters distribution curves.

Further, as seen from attached FIG. 5, a high correlation is recognized to exist between the leakages and TVP of +5 μm, and the leakage can be decreased generally to less than half of that of ordinary cordierites (Referential Example 1) by causing TVP of +5 μm to not over than 0.06 cc/g, so that airtight property of the cordierite series ceramics of the present invention are considerably improved. The leakage of the ceramic honeycomb structure of Example 6 which has a small value of TVP of +5 μm of about 0.01 cc/g as shown in FIG. 6 is considerably smaller than the value of about 0.075 cc/g of Referential Examples 1 and 3 derived from FIG. 6. Therefore, in the present ceramics, CTE is less than that of ordinary cordierite, so that excellent thermal shock resistance is also obtained. Therefore, the cordierite series ceramics of the present invention can achieve excellent airtight and thermal shock resistance properties suited well to structural material for high temperature use.

Figure 7:
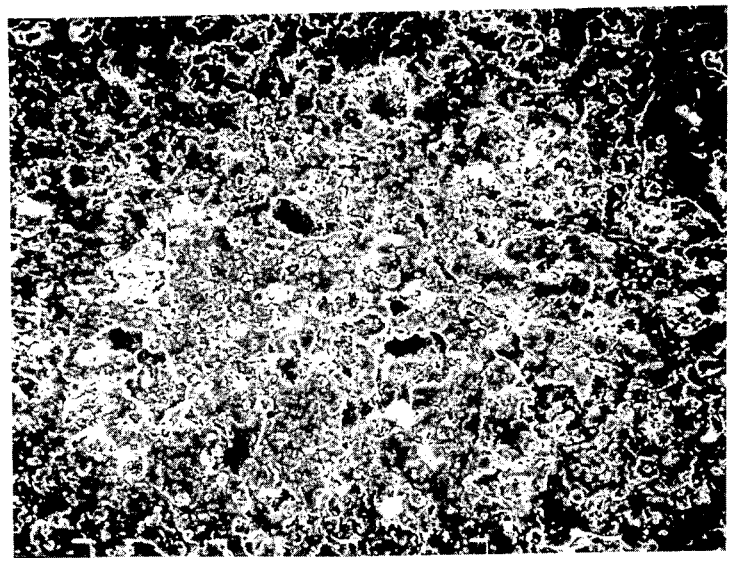
FIGS. 7 and 8 are enlarged microscopic graphs showing microstructures of conventional low expansion ceramics.
Figure 8:
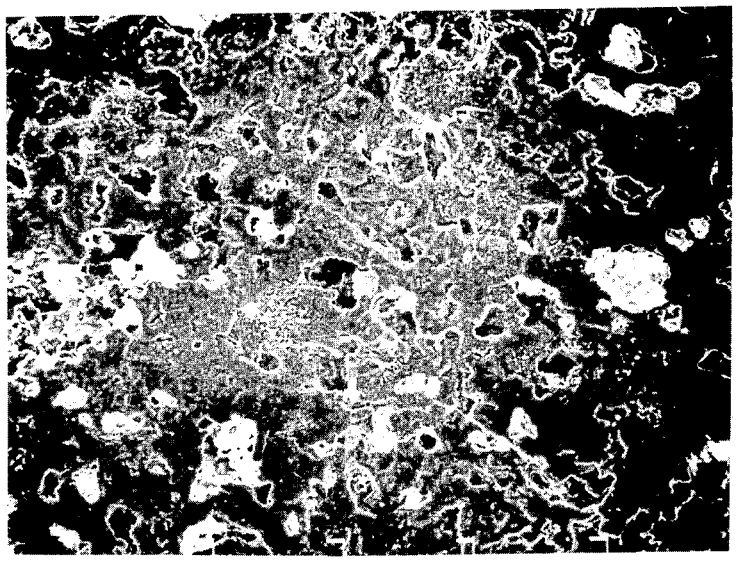
Figure 9:
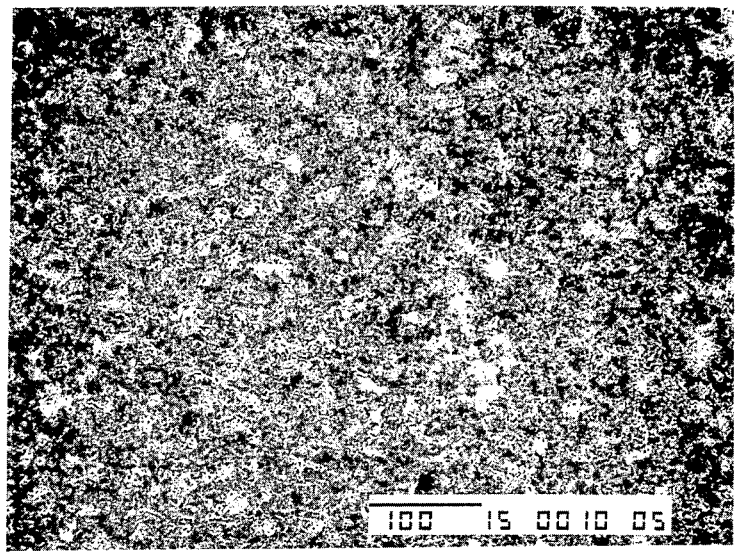
FIGS. 9 and 13 are enlarged microscopic graphs showing microstructures respectively of embodiments of the low expansion ceramics of the present invention.
Figure 13:
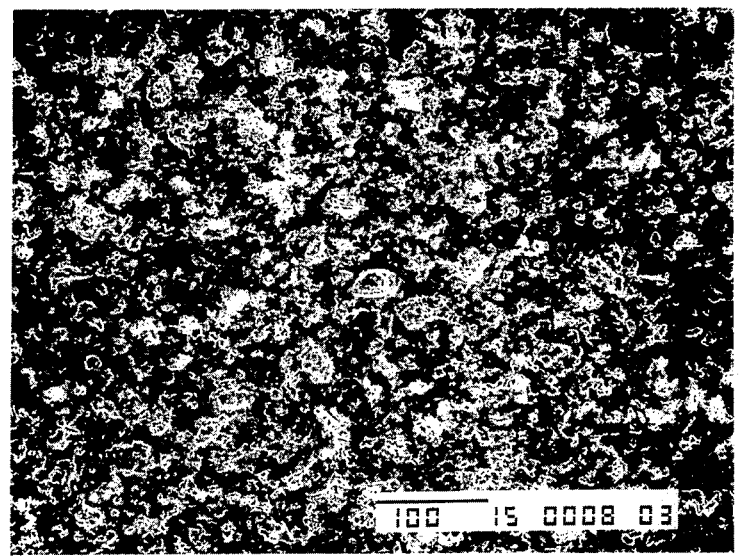

FIGS. 7 and 8 are microstructures respectively of the ceramics of Referential Examples 1 and 10, showing the structures are porous and have many large pores. FIGS. 9 and 13 are microstructures respectively of the ceramics of Examples 4 and 13, showing the structures are dense and have few large pores.

Figure 10:
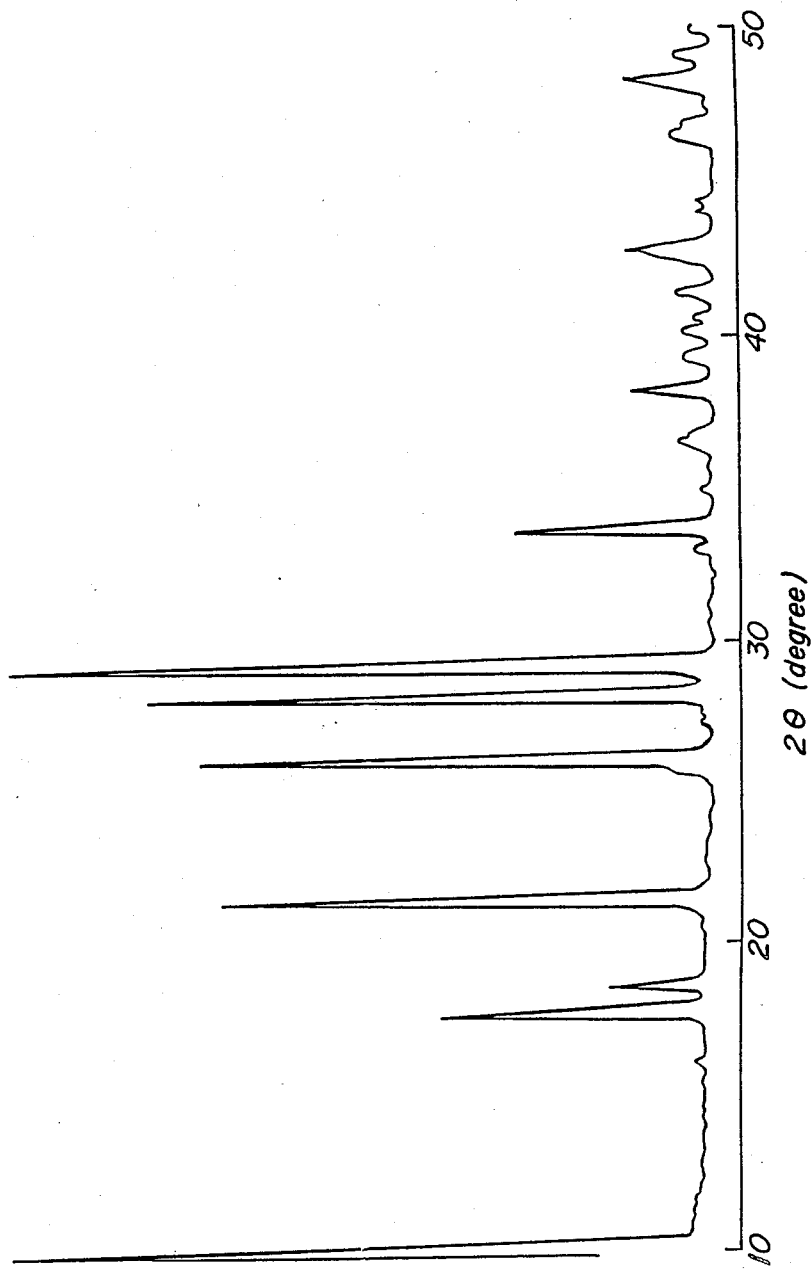
FIG. 10 is an X-ray diffraction chart used for identification of a crystal phase of an embodiment of the present invention.

FIG. 10 is an X-ray diffraction chart of the ceramics of Example 4 by CuKα ray, showing that the main crystal phase is cordierite phase.

EXAMPLES 14–29

The low expansion ceramics obtained in Examples 1–13 are acid treated with sulfuric, nitric or hydrochloric acid to selectively remove mainly P$_2$O$_5$, and further heat treated at 1,150° C.—the firing temperature as shown in the following Table 3 to produce cordierite series ceramic honeycomb structures of Examples 14–26. Table 3 shows also cordierite series honeycomb structures of Examples 27–29 which are produced in the similar manner as in Examples 14–26 by using the chemical compositions, the recipes, the firing conditions, acid treatment conditions and the heat treatment conditons of Table 3.

Figure 11:
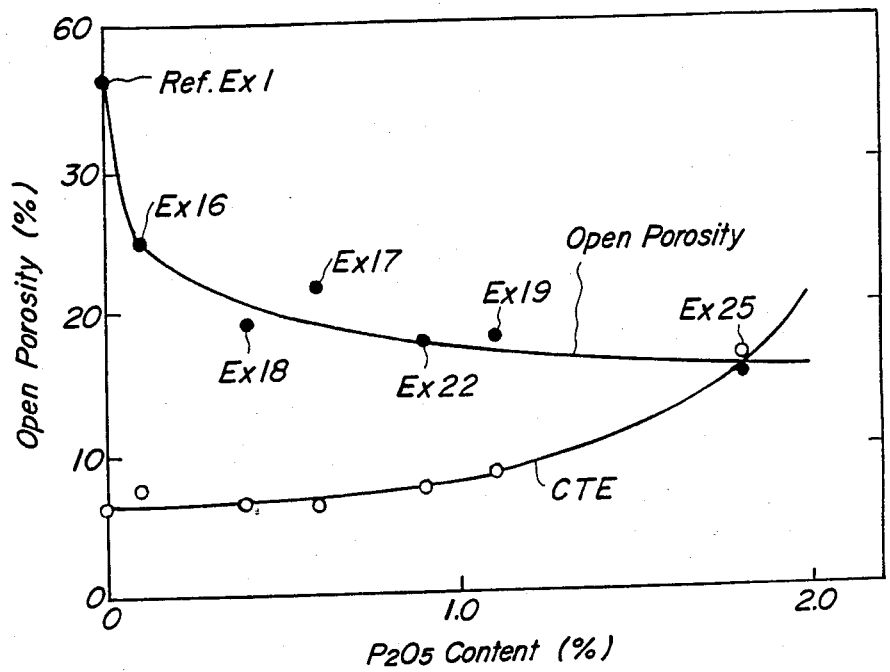
Figure 12:
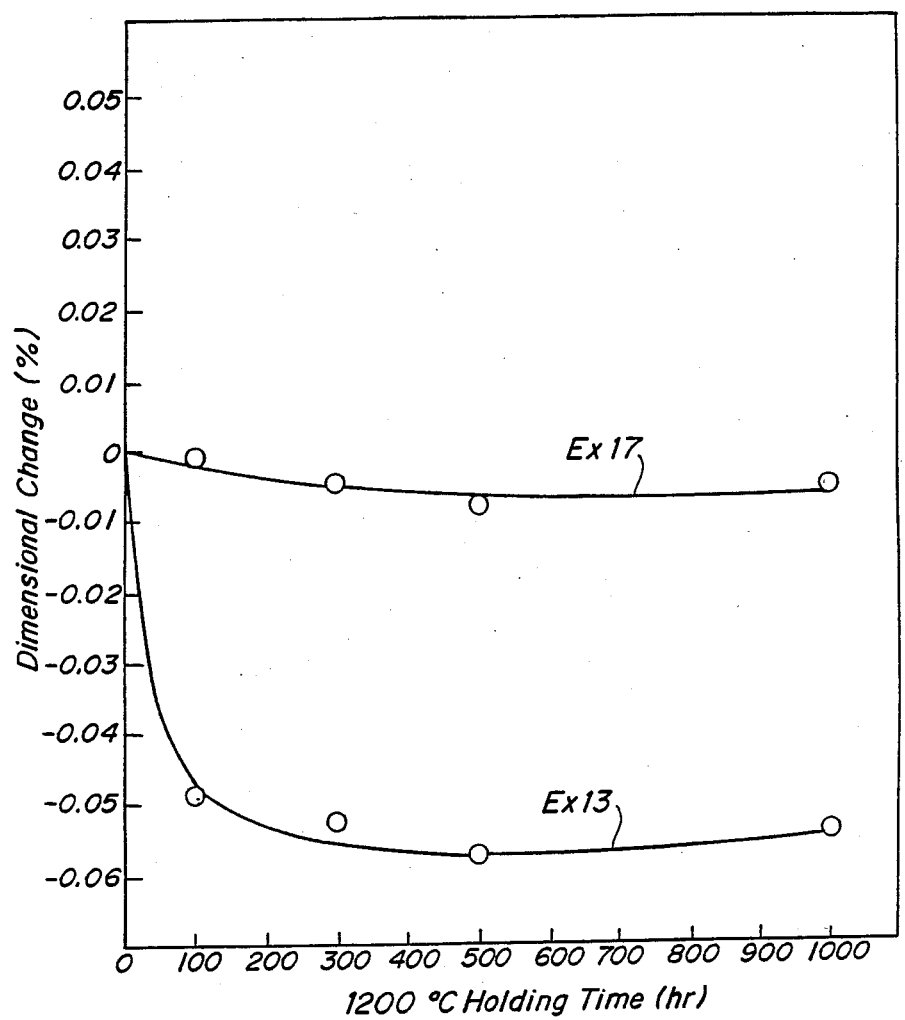
FIG. 12 is a graph showing time dependency of the dimensional change of the ceramic honeycomb structures of the present invention when held at 1,200° C.

Cordierite crystal phases, CTE, open porosity, TVP of +5 μm, and the leakage are measured in the same manner as mentioned above, and further the dimensional change in % of the ceramic honeycomb structures held at 1,200° C. for 1,000 hrs. are measured with the aid of a micrometer by producing and using specimens of the honeycomb structure of a size of 5 mm×5 mm and 50 mm length. The results are shown also in Table 1 and 3. In Table 3, the symbols * and ** and those without the symbols means the same ones as defined in Table 1. The results are also shown in FIGS. 11–13, partially.

TABLE 3(a)

| | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|
| Chemical composition (wt %) | | | | | | | | | | | | | | | | |
| MgO | 13.4 | 16.3 | 11.9 | 12.6 | 11.9 | 13.4 | 11.9 | 8.5 | 11.5 | 12.4 | 12.3 | 11.4 | 12.4 | 13.4 | 12.6 | 11.5 |
| Al$_2$O$_3$ | 27.5 | 27.8 | 40.2 | 35.6 | 36.7 | 27.3 | 40.1 | 38.3 | 38.4 | 44.8 | 43.1 | 39.4 | 36.2 | 27.5 | 35.6 | 38.4 |
| SiO$_2$ | 58.7 | 55.7 | 47.8 | 51.2 | 51.0 | 58.2 | 47.7 | 53.1 | 49.2 | 42.3 | 42.3 | 47.4 | 50.8 | 58.7 | 51.2 | 49.2 |
| P$_2$O$_5$ | 0.4 | 0.2 | 0.1 | 0.6 | 0.4 | 1.1 | 0.3 | 0.1 | 0.9 | 0.2 | 1.0 | 1.8 | 0.6 | 0.4 | 0.6 | 0.9 |
| ZnO | | | | | | | | | | | 1.3 | | | | | |
| Fe$_2$O$_3$ | | | | | | | | | | 0.3 | | | | | | |
| Recipe (wt %) | | | | | | | | | | | | | | | | |
| Bluesite | | | 8.7 | | | | | | | | | | | | | |
| Magnesite | | 8.5 | | | | | | | | | | | | | | |
| Talc (5μ) | 37.2 | 33.0 | 19.2 | 37.0 | 35.9 | 33.1 | 38.0 | 28.9 | 33.2 | 37.5 | 36.0 | 31.2 | 37.0* | 37.2 | 37.0 | 33.2 |
| Alumina | 9.2 | 10.4 | 19.8 | 9.7 | 9.4 | 8.1 | 23.9 | 18.4 | 8.7 | 26.7 | 26.6 | 8.2 | 9.7 | 9.2 | 9.7 | 8.7 |
| Aluminum hydroxide | | | | | | | | | | | 9.4 | | | | | |
| Clay | 50.7 | 45.2 | 48.9 | 48.3 | 46.7 | 52.2 | 29.8 | 44.6 | 43.2 | 22.1 | 24.5 | 40.6 | 48.3 | 50.7 | 48.3 | 43.1 |
| Aluminum phosphate | | 3.4 | 5.0 | 8.0 | | 8.3 | 8.1 | 15.0 | | 8.1 | 20.0 | 5.0 | | 5.0 | 15.0 | |

TABLE 3(a)-continued

|  | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|
| Magnesium phosphate | 2.9 | 2.9 |  |  |  | 6.6 |  |  |  |  |  |  |  | 2.9 |  |  |
| Zinc phosphate |  |  |  |  |  |  |  |  |  |  |  | 4.8 |  |  |  |  |
| Iron phosphate |  |  |  |  |  |  |  |  |  | 4.3 |  |  |  |  |  |  |

TABLE 3(b)

|  | Example |  |  |  |  |  |  |  |
|---|---|---|---|---|---|---|---|---|
|  | 14 | 15 | 16 | 17 | 18 | 19 | 20 | 21 |
| Firing Condition |  |  |  |  |  |  |  |  |
| Temperature (°C.) | 1,410 | 1,410 | 1,410 | 1,410 | 1,410 | 1,400 | 1,400 | 1,400 |
| Hrs. | 10 | 10 | 10 | 5 | 5 | 5 | 5 | 5 |
| Firing Index (SK) | $17^1$ | $17^1$ | $17^1$ | $16^5$ | $16^5$ | $16^4$ | $16^4$ | $16^4$ |
| Acid Treatment Condition |  |  |  |  |  |  |  |  |
| Acid | hydro-chloric | nitric | nitric | sulfuric | sulfuric | sulfuric | nitric | hydro-chloric |
| Concentration (N) | 2.0 | 1.0 | 1.0 | 1.5 | 1.5 | 1.5 | 1.5 | 1.5 |
| Temperature (°C.) | 80 | 95 | 95 | 95 | 95 | 95 | 95 | 95 |
| Time (min.) | 120 | 180 | 180 | 60 | 120 | 60 | 120 | 180 |
| Weight decrease (%) | 5.3 | 7.8 | 10.3 | 6.3 | 9.9 | 7.6 | 12.9 | 15.9 |
| Heat Treating Condition |  |  |  |  |  |  |  |  |
| Temperature (°C.) | 1,350 | 1,200 | 1,410 | 1,200 | 1,200 | 1,150 | 1,350 | 1,230 |
| Time (hr) | 3 | 5 | 1 | 5 | 10 | 20 | 3 | 5 |
| Product Properties |  |  |  |  |  |  |  |  |
| CTE ($\times 10^{-6}$/°C. in 25–800° C.) | 1.05 | 0.74 | 0.76 | 0.60 | 0.65 | 0.81 | 0.82 | 0.80 |
| Open porosity (%) | 23.3 | 24.7 | 25.0 | 21.5 | 19.0 | 17.8 | 20.5 | 20.7 |
| TVP of +5 μm(cc/g) | 0.060 | — | — | 0.044 | 0.035 | 0.010 | — | — |
| Cordierite phase (%) | 95 | 95 | 95 | 98 | 97 | 94 | 93 | 92 |
| Leakage (kg/m² · sec at 1.4 kg/cm²) | 0.110 | — | — | 0.057 | 0.024 | <0.01 | — | — |
| Dimensional Change (%) at 1200° C. for 1000 hrs. | −0.02 | −0.02 | −0.02 | −0.01 | −0.03 | −0.03 | −0.05 | −0.02 |

TABLE 3(c)

|  | Example |  |  |  |  |  |  |  |
|---|---|---|---|---|---|---|---|---|
|  | 22 | 23 | 24 | 25 | 26 | 27 | 28 | 29 |
| Firing Condition |  |  |  |  |  |  |  |  |
| Temperature (°C.) | 1,370 | 1,400 | 1,310 | 1,310 | 1,410 | 1,410 | 1,410 | 1,370 |
| Hrs. | 5 | 5 | 3 | 3 | 5 | 10 | 5 | 5 |
| Firing Index (SK) | $14^5$ | $16^4$ | $12^5$ | $12^5$ | $16^5$ | $17^1$ | $16^5$ | $14^5$ |
| Acid Treatment Condition |  |  |  |  |  |  |  |  |
| Acid | sulfuric | sulfuric | sulfuric | sulfuric | sulfuric | hydro-chloric | sulfuric | sulfuric |
| Concentration (N) | 1.5 | 1.5 | 0.5 | 1.5 | 2.0 | 2.0 | 1.5 | 1.5 |
| Temperature (°C.) | 95 | 95 | 95 | 95 | 95 | 80 | 95 | 95 |
| Time (min.) | 90 | 120 | 120 | 60 | 30 | 120 | 60 | 90 |
| Weight decrease (%) | 12.8 | 10.7 | 12.0 | 11.8 | 6.0 | 5.3 | 6.3 | 12.8 |
| Heat Treating Condition |  |  |  |  |  |  |  |  |
| Temperature (°C.) | 1,190 | 1,250 | 1,150 | 1,150 | 1,200 | 1,000 | 800 | 400 |
| Time (hr) | 15 | 5 | 30 | 20 | 5 | 5 | 10 | 100 |
| Product Properties |  |  |  |  |  |  |  |  |
| CTE ($\times 10^{-6}$/°C. in 25–800° C.) | 0.73 | 1.55 | 1.52 | 1.65 | 0.59 | 0.55 | 0.10 | 0.04 |
| Open porosity (%) | 17.5 | 20.0 | 17.0 | 15.0 | 16.9 | 23.3 | 21.5 | 17.5 |
| TVP of +5 μm(cc/g) | 0.028 | — | — | 0.024 | 0.027 | 0.060 | 0.044 | 0.028 |
| Cordierite phase (%) | 95 | 85 | 85 | 90 | 98 | 95 | 98 | 95 |
| Leakage (kg/m² · sec at 1.4 kg/cm²) | <0.01 | — | — | <0.01 | <0.01 | 0.110 | 0.057 | <0.01 |
| Dimensional Change (%) at 1200° C. for 1000 hrs. | −0.03 | −0.03 | −0.04 | −0.05 | −0.02 | −0.07 | −0.06 | −0.11 |

As apparent from the results of Examples 5, 6, 12 and 13 and Referential Examples 1–10 in Table 1 and Examples 14–29 in Table 3, by acid treating the sintered body of the chemical composition comprising 7.5–20.0% by weight of MgO, 22.0–44.3% by weight of $Al_2O_3$, 37.0–60.0% by weight of $SiO_2$ and 2.0–10.0% by weight of $P_2O_3$, the purposed low expansion ceramics of the chemical composition comprising 8.0–20.5% by weight of MgO, 24.0–45.0% by weight of $Al_2O_3$, 40.5–61.0% by weight of $SiO_2$ and less than 2% by weight of $P_2O_5$, open porosity of not over than 25% by volume and CTE of $2.0 \times 10^{-6}$/°C. or less can be obtained.

It can be also seen from Table 3 that low expansion ceramics of the present invention can be obtained also when MgO in the raw materials is substituted partially by Zn or Fe.

As seen from FIG. 12, by heat treating the specimens at a high temperature of 1,150° C.—the firing temperature according to an aspect of the present invention, cordierite series ceramics of more preferable dimensional stability can be obtained which, after held at 1,200° C. for 1,000 hrs., has small dimensional change of ±0.05% or less, so that they are particularly suited well to structural materials for high temperature use which necessitate superior airtight property and excellent thermal shock resistance owing to low CTE.

There are no substantial changes in pore diameter distribution curves and microstructures of the heat treated cordierite series ceramics caused by the heat treatment, and airtight property and low expansion property of the heat treated cordierite series ceramics are not suffered from adverse influences by the heat treatment. Furthermore, dimensional stability of the product cordierite series ceramics is promoted. This is presumably due to the healing of the defects formed in the sintered body by the acid treatment.

As seen from FIG. 13, the cordierite series ceramics of Example 17 has few large pores and is more dense as compared with those of Referential Examples 1 and 10 shown in FIGS. 7 and 8.

Referential Examples 11-23

Sintered bodies of Referential Examples 11-23 are produced in the same manner as in Examples 1-13 except for the acid treatment. Characteristic properties of Referential Examples 11-23 are measured. The results are shown in the following Table 4 and partially in the attached FIGS. 14-20.

weight of $P_2O_5$, low expansion ceramics of open porosites of not more than 15% by volume and CTE of not more than $2.0 \times 10^{-6}$/°C. can be obtained. Also, it can be seen from Table 4 that the chemical compositions of the sintered bodies comprising 7.5-20.0% by weight of MgO, 22.0-44.3% by weight of $Al_2O_3$ and 37.0-60.0% by weight of $SiO_2$ are preferable for obtaining the low expansion ceramics when their $P_2O_5$ contents are within the range of 2.0-10.0% by weight. Also, it can be seen from Table 4 that partial substitution of Mg in the cordierite phases by Zn or Fe can provide suitable sintered bodies for producing the low expansion ceramics of the present invention.

Figure 15:
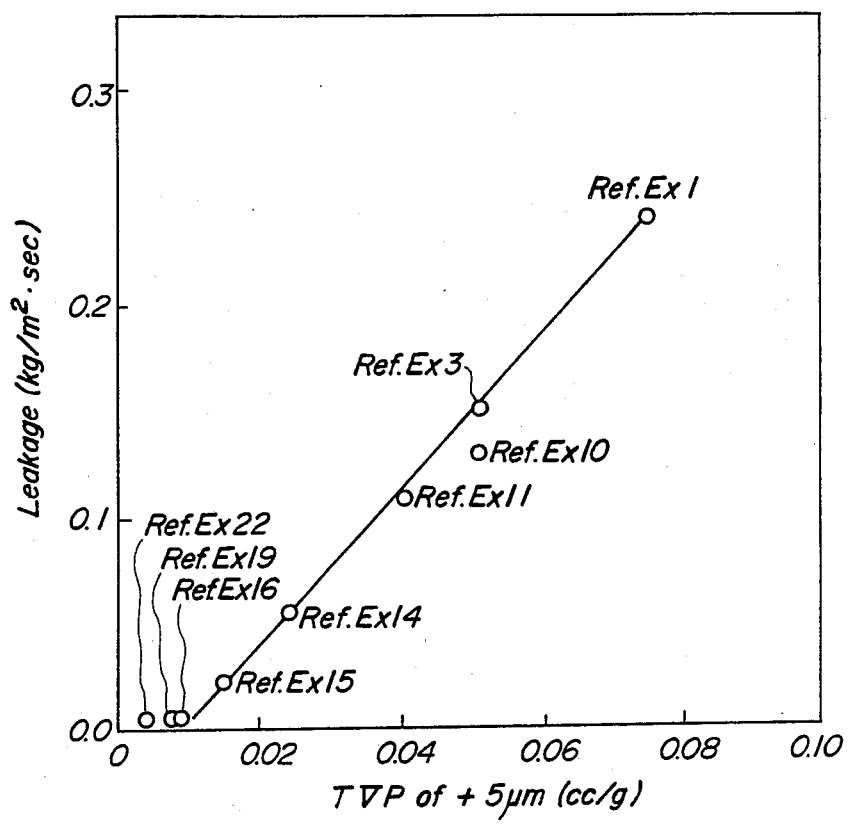
FIG. 15 is a characteristic graph showing a relation between TVP of $+5$ $\mu m$ and leakage of pressurized air of 1.4 kg/cm$^2$ through the thin partition walls of ceramic honeycomb structures not subjected to acid treatment.

Further, as seen from attached FIG. 15 which shows relations of leakage of pressurized air of 1.4 kg/cm² through the partition walls of the ceramic honeycomb structures and TVP of +5 μm, a high correlation is recognized to exist between the leakages and TVP of +5 μm. Namely, the leakage increases with the increase of TVP of +5 μm. It can be seen that the sintered body of Referential Example 16 having small value of TVP of +5 μm has a considerably small leakage than those of Referential Examples 1 and 10. Furthermore, it can be seen from the general view of FIG. 15 that by causing TVP of +5 μm to not over than 0.04 cc/g the leakage can be decreased generally to half or less than half of that of ordinary cordierite ceramics (Referential Example 1), so that airtight properties of the sintered bodies are considerably improved. In addi- TABLE 4(a)

| | Referential Examples | | | | | | | | | | | | |
|---|---|---|---|---|---|---|---|---|---|---|---|---|---|
| | 11 | 12 | 13 | 14 | 15 | 16 | 17 | 18 | 19 | 20 | 21 | 22 | 23 |
| Chemical composition (wt %) | | | | | | | | | | | | | |
| MgO | 14.1 | 17.6 | 13.2 | 12.9 | 12.5 | 13.7 | 12.8 | 9.9 | 11.7 | 12.9 | 12.0 | 11.2 | 12.9 |
| $Al_2O_3$ | 27.7 | 28.2 | 41.0 | 36.1 | 36.4 | 26.9 | 39.7 | 39.0 | 36.8 | 43.7 | 40.4 | 37.0 | 36.1 |
| $SiO_2$ | 56.2 | 52.2 | 43.8 | 48.1 | 46.7 | 54.4 | 42.5 | 46.1 | 43.7 | 38.0 | 37.6 | 41.8 | 48.1 |
| $P_2O_5$ | 2.0 | 2.0 | 2.0 | 2.9 | 4.4 | 5.0 | 5.0 | 5.0 | 7.8 | 2.5 | 8.0 | 10.0 | 2.9 |
| ZnO | | | | | | | | | | | 2.0 | | |
| $Fe_2O_3$ | | | | | | | | | | 2.9 | | | |
| Recipe (wt %) | | | | | | | | | | | | | |
| Bluesite | | | 8.7 | | | | | | | | | | |
| Magnesite | | 8.5 | | | | | | | | | | | |
| Talc (5μ) | 37.2 | 33.0 | 19.2 | 37.0 | 35.9 | 33.1 | 38.0 | 28.9 | 33.2 | 37.5 | 36.0 | 31.2 | 37.0* |
| Alumina | 9.2 | 10.4 | 19.8 | 9.7 | 9.4 | 8.1 | 23.9 | 18.4 | 8.7 | 26.7 | 26.6 | 8.2 | 9.7 |
| Aluminum hydroxide | | | | | | | | | | 9.4 | | | |
| Clay | 50.7 | 45.2 | 48.9 | 48.3 | 46.7 | 52.2 | 29.8 | 44.6 | 43.1 | 22.1 | 24.5 | 40.6 | 48.3 |
| Aluminum phosphate | | | 3.4 | 5.0 | 8.0 | | 8.3 | 8.1 | 15.0 | | 8.1 | 20.0 | 5.0 |
| Magnesium phosphate | 2.9 | 2.9 | | | | 6.6 | | | | | | | |
| Zinc phosphate | | | | | | | | | | | | 4.8 | |
| Iron phosphate | | | | | | | | | | 4.3 | | | |

TABLE 4(b)

| | Referential Examples | | | | | | | | | | | | |
|---|---|---|---|---|---|---|---|---|---|---|---|---|---|
| | 11 | 12 | 13 | 14 | 15 | 16 | 17 | 18 | 19 | 20 | 21 | 22 | 23 |
| Firing Condition | | | | | | | | | | | | | |
| Temperature (°C.) | 1,410 | 1,410 | 1,410 | 1,410 | 1,410 | 1,400 | 1,400 | 1,400 | 1,370 | 1,400 | 1,310 | 1,310 | 1,410 |
| Hrs. | 10 | 10 | 10 | 5 | 5 | 5 | 5 | 5 | 5 | 5 | 3 | 3 | 5 |
| Firing Index (SK) | $17^1$ | $17^1$ | $17^1$ | $16^5$ | $16^5$ | $16^4$ | $16^4$ | $16^4$ | $14^5$ | $16^3$ | $12^5$ | $12^5$ | $16^5$ |
| Product Properties | | | | | | | | | | | | | |
| CTE ($\times 10^{-6}$/°C. in 25-800° C.) | 1.10 | 0.84 | 0.86 | 0.70 | 0.75 | 0.91 | 0.92 | 0.90 | 0.83 | 1.85 | 1.82 | 1.95 | 0.71 |
| Open porosity (%) | 13.3 | 14.7 | 15.0 | 11.5 | 9.0 | 7.8 | 10.5 | 10.7 | 7.5 | 10.0 | 7.0 | 5.0 | 6.9 |
| TVP of +5 μm(cc/g) | 0.040 | — | — | 0.024 | 0.015 | 0.009 | — | — | 0.008 | — | — | 0.004 | 0.007 |
| Cordierite phase (%) | 95 | 95 | 95 | 98 | 97 | 94 | 93 | 92 | 95 | 85 | 85 | 90 | 98 |
| Leakage (kg/m² · sec at 1.4 kg/cm²) | 0.110 | — | — | 0.057 | 0.024 | <0.01 | — | — | <0.01 | — | — | <0.01 | <0.01 |
| Dimensional Change (%) at 1200° C. × 1000 hr | — | — | — | — | — | — | — | — | — | — | — | +1.02* | +0.99* |

Figure 14:
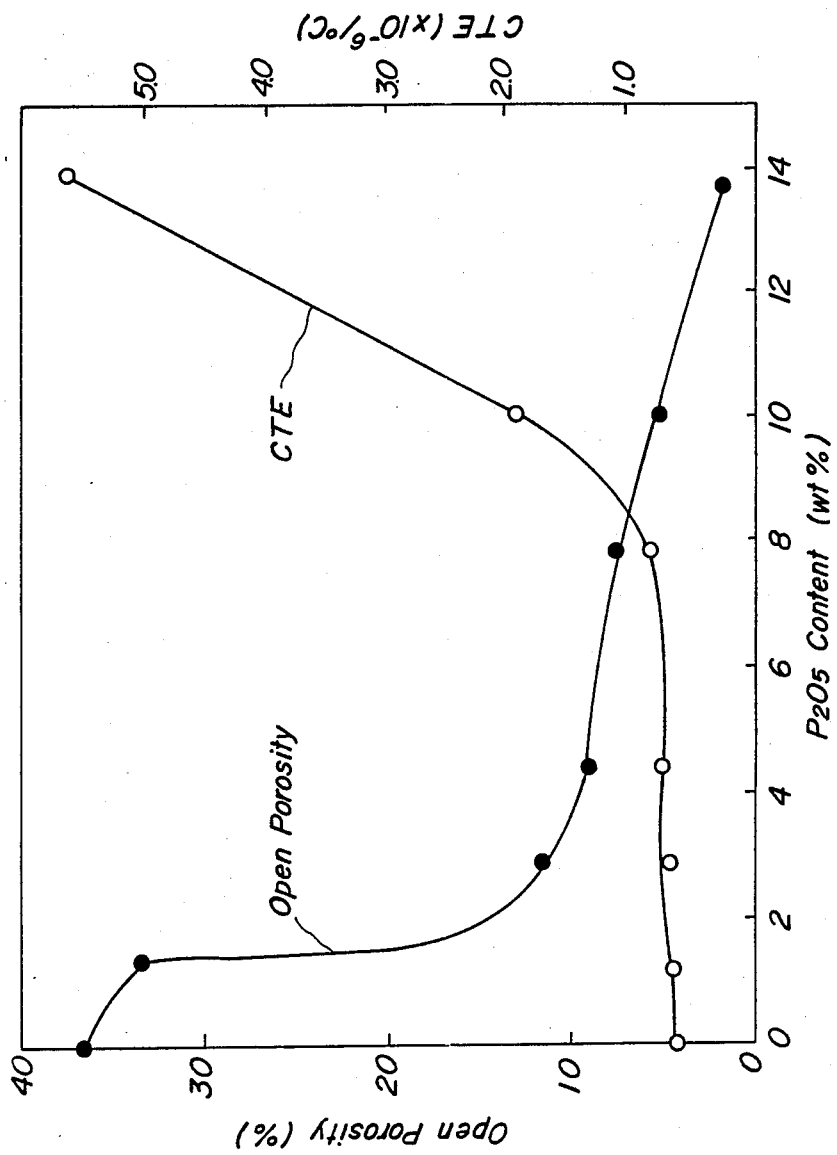
FIG. 14 is a characteristic graph showing relations between $P_2O_5$ content and open porosity or CTE of cordierite series ceramic honeycomb structures not subjected to acid treatment.

As seen from the above Table 4 and attached FIG. 14, when the cordierite ceramics contain 2.0-10.0% by tion, CTE is equal to or less than that of ordinary cordierite ceramics, so that the sintered bodies exhibit also excellent thermal shock resistance. Therefore, the sintered bodies can achieve excellent properties suitable for structural material for high temperature use, and are suited well to produce the cordierite series ceramics of the present invention by the acid treatment.

Figure 16:
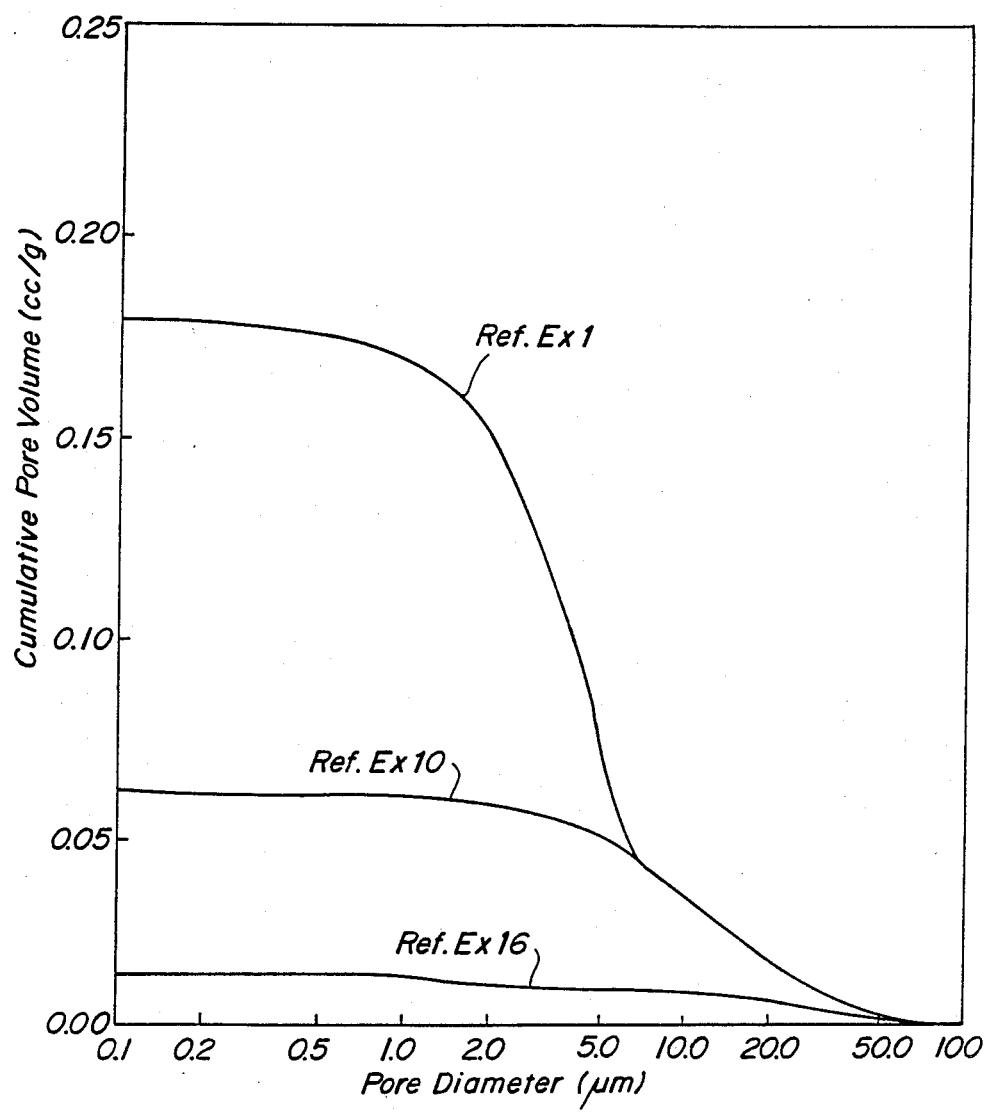
FIG. 16 is a graph showing pore diameters distrubution curves of ceramic honeycomb structures nnot subjected to acid treatment.

FIG. 16 attached shows pore diameters distribution curves of Referential Examples 1, 10 and 16. It can be seen from FIG. 16 that TVP of +5 μm is an extremely large value of about 0.075 cc/g for Referential Example 1 and a large value of about 0.05 cc/g for Referential Example 10, while it is a much small value of about 0.01 cc/g for Referential Example 16.

Referential Examples 24–41

The low expansion ceramics obtained in Referential Examples 11–23 are further heat treated at 800°–1,400° C. as shown in the following Table 5 to produce cordierite series ceramic honeycomb structures of Referential Examples 24–41 which are produced in the similar manner as in Referential Examples 11–23 by using the chemical compositions, the recipes, the firing conditions and the heat treatment conditions of Table 5 and without using the acid treatment.

Cordierite crystal phases, CTE, open porosity, TVP of +5 μm, and the leakage are measured in the same manner as mentioned above, and further the dimensional change in % of the ceramic honeycomb structures held at 1,200° C. for 1,000 hrs. are measured with the aid of a micrometer by producing and using specimens of the honeycomb structure of a size of 5 mm×5 mm and 50 mm length. The results are shown also in Table 5. The results of dimensional change of the honeycomb structures of Referential Examples 22 and 23 of the size of 5 mm×5 mm and 50 mm length not subjected to the heat treatment are also shown in the above Table 4, for comparison use. In Table 5, the symbols * and ** and those without the symbols means the same ones as defined in Table 1.

TABLE 5(a)

| | Referential Examples | | | | | | | | |
|---|---|---|---|---|---|---|---|---|---|
| | 24 | 25 | 26 | 27 | 28 | 29 | 30 | 31 | 32 |
| Chemical composition (wt %) | | | | | | | | | |
| MgO | 14.1 | 17.6 | 13.2 | 12.9 | 12.5 | 13.7 | 12.8 | 9.9 | 11.7 |
| $Al_2O_3$ | 27.7 | 28.2 | 41.0 | 36.1 | 36.4 | 26.9 | 39.7 | 39.0 | 36.8 |
| $SiO_2$ | 56.2 | 52.2 | 43.8 | 48.1 | 46.7 | 54.4 | 42.5 | 46.1 | 43.7 |
| $P_2O_5$ | 2.0 | 2.0 | 2.0 | 2.9 | 4.4 | 5.0 | 5.0 | 5.0 | 7.8 |
| ZnO | | | | | | | | | |
| $Fe_2O_3$ | | | | | | | | | |
| Recipe (wt %) | | | | | | | | | |
| Bluesite | | | | 8.7 | | | | | |
| Magnesite | | 8.5 | | | | | | | |
| Talc (5μ) | 37.2 | 33.0 | 19.2 | 37.0 | 35.9 | 33.1 | 38.0 | 28.9 | 33.2 |
| Alumina | 9.2 | 10.4 | 19.8 | 9.7 | 9.4 | 8.1 | 23.9 | 18.4 | 8.7 |
| Aluminum hydroxide | | | | | | | | | |
| Clay | 50.7 | 45.2 | 48.9 | 48.3 | 46.7 | 52.2 | 29.8 | 44.6 | 43.1 |
| Aluminum phosphate | | | 3.4 | 5.0 | 8.0 | | 8.3 | 8.1 | 15.0 |
| Magnesium phosphate | 2.9 | 2.8 | | | | 6.6 | | | |
| Zinc phosphate | | | | | | | | | |
| Iron phosphate | | | | | | | | | |

TABLE 5(b)

| | Referential Examples | | | | | | | | |
|---|---|---|---|---|---|---|---|---|---|
| | 24 | 25 | 26 | 27 | 28 | 29 | 30 | 31 | 32 |
| Firing Condition | | | | | | | | | |
| Temperature (°C.) | 1,410 | 1,410 | 1,410 | 1,410 | 1,410 | 1,400 | 1,400 | 1,400 | 1,370 |
| Hrs. | 10 | 10 | 10 | 5 | 5 | 5 | 5 | 5 | 5 |
| Firing index (SK) | $17^1$ | $17^1$ | $17^1$ | $16^5$ | $16^5$ | $16^4$ | $16^4$ | $16^4$ | $14^5$ |
| Heat treating condition | | | | | | | | | |
| Temperature (°C.) | 1,350 | 1,200 | 1,300 | 1,200 | 1,200 | 1,150 | 1,350 | 1,230 | 1,190 |
| Hrs. | 200 | 300 | 200 | 300 | 350 | 500 | 200 | 200 | 500 |
| Product Properties | | | | | | | | | |
| CTE ($\times 10^{-6}$/°C. in 25–800° C.) | 1.08 | 0.82 | 0.84 | 0.68 | 0.73 | 0.89 | 0.90 | 0.88 | 0.81 |
| Open porosity (%) | 13.3 | 14.7 | 15.0 | 11.5 | 9.0 | 7.8 | 10.5 | 10.7 | 7.5 |
| TVP of +5 μm(cc/g) | 0.040 | — | — | 0.024 | 0.015 | 0.009 | — | — | 0.008 |
| Cordierite phase (%) | 95 | 95 | 95 | 98 | 97 | 94 | 93 | 92 | 95 |
| Leakage (kg/$m^2$ · sec at 1.4 kg/$cm^2$) | 0.110 | — | — | 0.057 | 0.024 | <0.01 | — | — | <0.01 |
| Dimensional change (%) at 1,200° C. × 1,000 h | +0.02 | +0.02 | +0.02 | +0.02 | +0.03 | +0.03 | +0.05 | +0.02 | +0.03 |

TABLE 5(c)

| | Referential Examples | | | | | | | | |
|---|---|---|---|---|---|---|---|---|---|
| | 33 | 34 | 35 | 35 | 37 | 38 | 39 | 40 | 41 |
| Chemical composition (wt %) | | | | | | | | | |
| MgO | 12.9 | 12.0 | 11.2 | 12.9 | 14.1 | 12.9 | 12.5 | 13.7 | 11.7 |
| $Al_2O_3$ | 43.7 | 40.4 | 37.0 | 36.1 | 27.7 | 36.1 | 36.4 | 26.9 | 36.8 |
| $SiO_2$ | 38.0 | 37.6 | 41.8 | 48.1 | 56.2 | 48.1 | 46.7 | 54.4 | 43.7 |
| $P_2O_5$ | 2.5 | 8.0 | 10.0 | 2.9 | 2.0 | 2.9 | 4.4 | 5.0 | 7.8 |

TABLE 5(c)-continued

|  | Referential Examples | | | | | | | | |
|---|---|---|---|---|---|---|---|---|---|
|  | 33 | 34 | 35 | 35 | 37 | 38 | 39 | 40 | 41 |
| ZnO |  | 2.0 |  |  |  |  |  |  |  |
| $Fe_2O_3$ | 2.9 |  |  |  |  |  |  |  |  |
| Recipe (wt %) |  |  |  |  |  |  |  |  |  |
| Bluesite |  |  |  |  |  |  |  |  |  |
| Magnesite |  |  |  |  |  |  |  |  |  |
| Talc (5μ) | 37.5 | 36.0 | 31.2 | 37.0* | 37.2 | 37.0 | 35.9 | 33.1 | 33.2 |
| Alumina | 26.7 | 26.6 | 8.2 | 9.7 | 9.2 | 9.7 | 9.4 | 8.1 | 8.7 |
| Aluminum hydroxide | 9.4 |  |  |  |  |  |  |  |  |
| Clay | 22.1 | 24.5 | 40.6 | 48.3 | 50.7 | 48.3 | 46.7 | 52.2 | 43.1 |
| Aluminum phosphate |  | 8.1 | 20.0 | 5.0 |  | 5.0 | 8.0 |  | 15.0 |
| Magnesium phosphate |  |  |  |  | 2.9 |  |  | 6.6 |  |
| Zinc phosphate |  | 4.8 |  |  |  |  |  |  |  |
| Iron phosphate | 4.3 |  |  |  |  |  |  |  |  |

TABLE 5(d)

|  | Referential Examples | | | | | | | | |
|---|---|---|---|---|---|---|---|---|---|
|  | 33 | 34 | 35 | 36 | 37 | 38 | 39 | 40 | 41 |
| Firing Condition |  |  |  |  |  |  |  |  |  |
| Temperature (°C.) | 1,400 | 1,310 | 1,310 | 1,410 | 1,410 | 1,410 | 1,410 | 1,400 | 1,370 |
| Hrs. | 5 | 3 | 3 | 5 | 10 | 5 | 5 | 5 | 5 |
| Firing index (SK) | $16^3$ | $12^5$ | $12^5$ | $16^5$ | $17^1$ | $16^5$ | $16^5$ | $16^4$ | $14^5$ |
| Heat treating condition |  |  |  |  |  |  |  |  |  |
| Temperature (°C.) | 1,250 | 1,150 | 1,150 | 1,200 | 1,000 | 800 | 1,400 | 1,200 | 900 |
| Hrs. | 300 | 500 | 500 | 500 | 10 | 300 | 3 | 1 | 500 |
| Product Properties |  |  |  |  |  |  |  |  |  |
| CTE ($\times 10^{-6}$/°C. in 25-800° C.) | 1.83 | 1.80 | 1.93 | 0.69 | 1.10 | 0.70 | 0.75 | 0.91 | 0.83 |
| Open porosity (%) | 10.0 | 7.0 | 5.0 | 6.9 | 13.3 | 11.5 | 9.0 | 7.8 | 7.5 |
| TVP of +5 μm(cc/g) | — | — | 0.004 | 0.007 | 0.040 | 0.024 | 0.015 | 0.009 | 0.008 |
| Cordierite phase (%) | 85 | 85 | 90 | 98 | 95 | 98 | 97 | 94 | 95 |
| Leakage (kg/m² · sec at 1.4 kg/cm²) | — | — | <0.01 | <0.01 | 0.110 | 0.057 | 0.024 | <0.01 | <0.01 |
| Dimensional change (%) at 1,200° C. × 1,000 h | +0.03 | +0.04 | +0.05 | +0.02 | +0.65 | +0.95 | +0.92 | +0.85 | +0.95 |

As apparent from the results of Referential Examples 24–36 in Table 5, by the incorporation of 2.0–10.0% by weight of $P_2O_5$ in the cordierite ceramics, the low expansion ceramics of open porosity of not over than 15% by volume and CTE of $2.0 \times 10^{-6}$/°C. or less can be obtained.

Further, as seen from Table 5, the chemical compositions comprising 7.5–20.0% by weight of MgO, 22.0–44.3% by weight of $Al_2O_3$ and 37.0–60.0% by weight of $SiO_2$ are preferable when the $P_2O_5$ content is 2.0–10.0% by weight in the composition of the cordierite ceramics.

It can be also seen from Table 5 that low expansion ceramics can be obtained also when MgO in the composition of the cordierite ceramics is substitued partially by Zn or Fe.

It can be seen from comparison of Table 5 with Table 4 that CTE of Referential Examples 24–36 are smaller than CTE of Referential Examples 11–23 approximately by a value of 0.02 owing to the heat treatment of 1,150°–1,350° C.

There are no substantial changes in pore diameter distribution curves and microstructures of the heat treated cordierite series ceramics caused by the heat treatment of 1,150°–1,350° C., and airtight property and low expansion property of the heat treated cordierite series ceramics do not suffer from adverse influences by the heat treatment. Furthermore, dimensional stability of the product cordierite series ceramics is promoted. This is presumably due to the increase of cordierite crystals transformed from the glass phase.

As seen from Table 5, by heat treating the sintered bodies at a high temperature of 1,150°–1,350° C., cordierite series ceramics of more preferable dimensional stability can be attained which, after held at 500°–1,200° C. for 1,000 hrs., has small dimensional change of ±0.05% or less, the dimensional change of ±0.05% being substantially equal to the dimensional change of conventional most preferable cordierite ceramics.

The prolonged heat treatment at 500°–1,200° C. causes the dimension of the sintered bodies to increase, because the remaining glass phase is crystallized. Therefore, dimensional stability of the sintered bodies is improved by preliminarily heat treating the sintered bodies at 1,150°–1,350° C. to crystallize the glass phase prior to practical high temperature use. The heat treatment is preferably effected at 1,150°–1,350° C., because the crystallization rate is slow at less than 1,150° C. and crystallization of the glass phase hardly occurs at more than 1,350° C.

Figure 17:
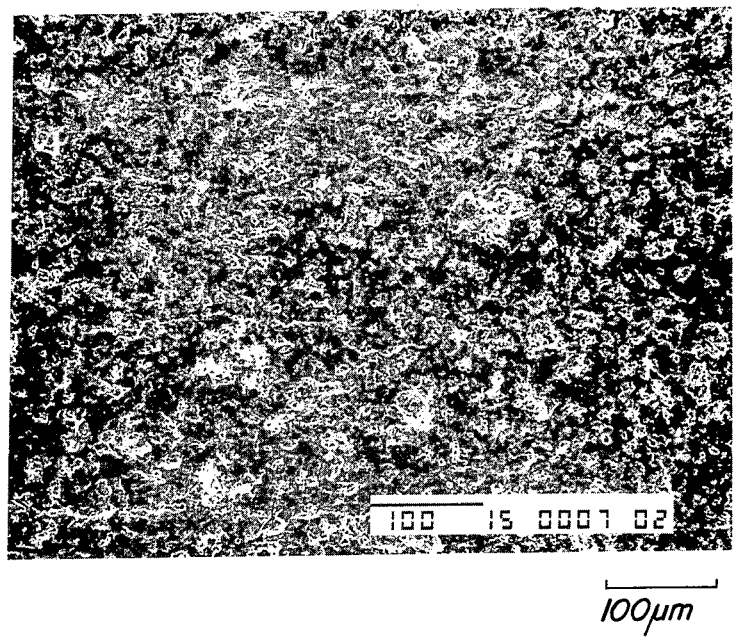
FIGS. 17 and 18 are enlarged microscopic graphs showing microstructures of honeycomb structures not subjected to acid treatment.
Figure 18:
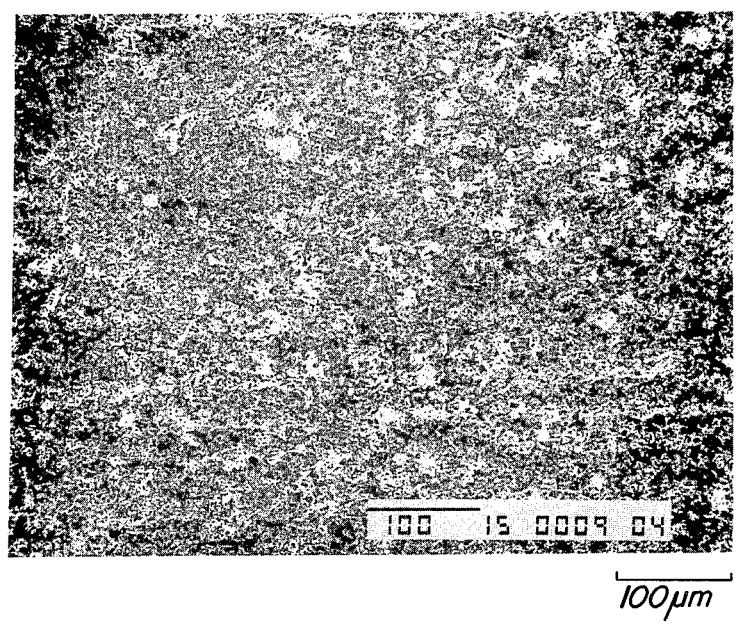

Attached FIGS. 17 and 18 show respectively microstructures of the cordierite series ceramics of Referential Examples 27 and 23. It is seen from FIGS. 17 and 18 that the cordierite series ceramics have few large pores and are very dense.

Figure 19:
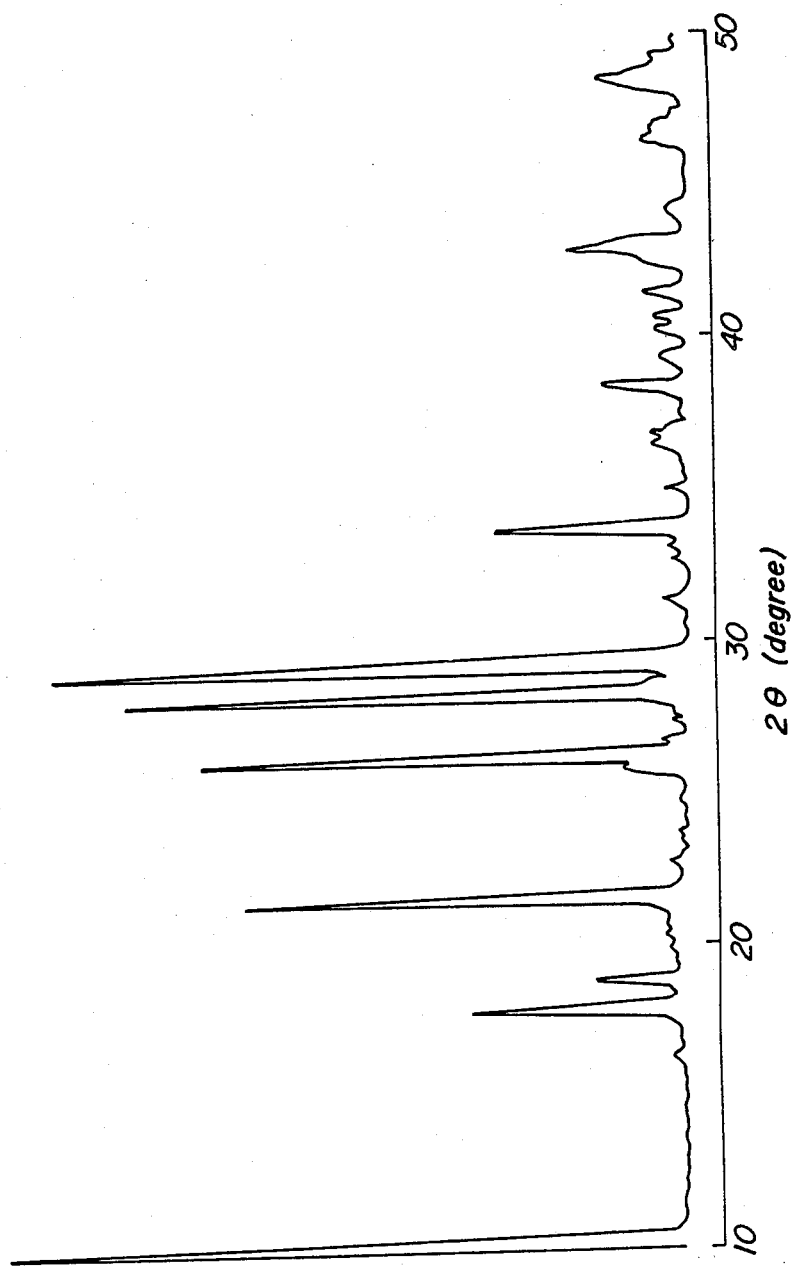
FIG. 19 is an X-ray diffraction chart used for identification of a crystal phase of a ceramic honeycomb structure not subjected to acid treatment.
Figure 20:
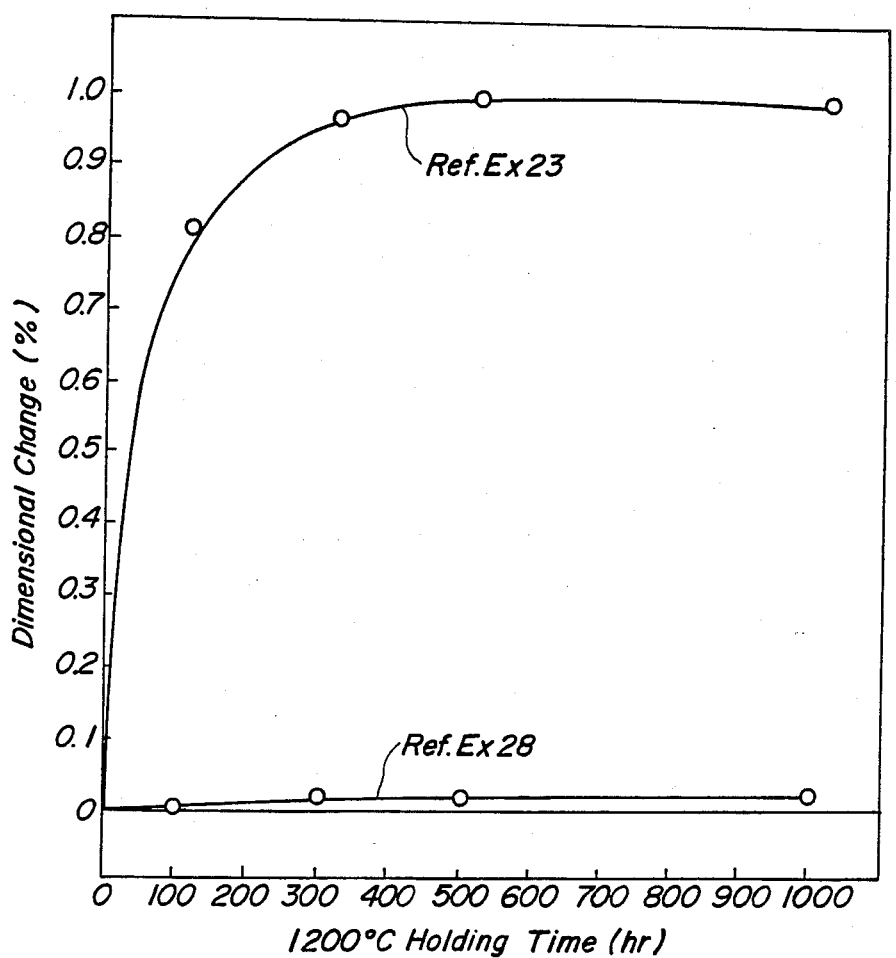
FIG. 20 is a characteristic graph showing relations in heat treatment between holding time and dimensional change of cordierite series ceramic honeycomb structures not subjected to acid treatment.

Attached FIG. 19 shows an X-ray diffraction chart of the cordierite series ceramics of Referential Example 27 using $CuK_\alpha$ radiation. It is understood from the chart that main crystal phase consists of cordierite phases.

As described in detail in the foregoing descriptions, the present invention provides dense and low expansion ceramics which have low expansion property equal to or less than that of cordierite ceramics by acid treating the cordierite ceramics containing 2–10% by weight of $P_2O_5$. In addition, low expansion ceramics with decreased dimensional change at high temperatures can be obtained by heat treating the fired products further at 1,150° C.—the firing temperature, while maintaining the low expansion property of the cordierite ceramics.

Therefore, the low expansion ceramics of the present invention can be used in practice not only as ceramic regenerators of heat exchangers, but also broadly as ceramic recuperators, ceramic turbocharger rotor housings, gas turbine rotors, nuclear reactor materials, various automobile parts such as engine muffler, exhaust port, exahust manifold and exhaust gas purifying catalyst carrier, heat exchangers and the like low expansion substances which need to have airtight properties, low CTE and small dimensional change at high temperatures, so that the present invention is eminently useful industrially.

Although the present invention has been described with reference to specific examples and numerical values, it should be understood that the present invention is not restricted to such examples and numerical values, and numerous changes and modifications are possible without departing from the broad spirit and the aspect of the present invention as defined in the appended claims.

What is claimed is:

1. A low expansion ceramic comprising: 8.0-20.5% by weight of MgO, 24.0-45.0% by weight of $Al_2O_3$, 40.5-61.0% by weight of $SiO_2$ and 0.1-2.0% by weight of $P_2O_5$, a main crystal phase of cordierite phases, an open porosity of not greater than 25% by volume, and an average thermal expansion coefficient of not greater than $2.0 \times 10^{-6}$/°C. in a temperature range of 25°-800° C.

2. A low expansion ceramic as defined in claim 1, having an average thermal expansion coefficient of not greater than $1.0 \times 10^{-6}$/°C. in a temperature range of 25°-800° C.

3. A low expansion ceramic as defined in claim 1, having a dimensional change of not greater than ±0.05% after held at a temperature of 500°-1,200° C. for 1,000 hrs.

4. A low expansion ceramic as defined in claim 1, having a total pore volume of not more than 0.06 cc/g from pores of diameters of not less than 5 $\mu$m.

5. A low expansion ceramic as defined in claim 1, wherein Mg in said cordierite phases is partially substituted for by an element selected from the group consisting of Zn and Fe in an amount of 10 mol % maximum.

6. A method of producing a low expansion ceramic, comprising, preparing a batch of raw materials having a chemical composition comprising 7.5-20.0% by weight of MgO, 22.0-44.3% by weight of $Al_2O_3$, 37.0-60.0% by weight of $SiO_2$ and 2.0-10.0% by weight of $P_2O_5$, forming the prepared batch into a shaped body, drying the shaped body, firing the dried shaped body to obtain a sintered body, and acid treating the sintered body to selectively remove primarily $P_2O_5$ from the sintered body to obtain a low expansion ceramic having a $P_2O_5$ content of 0.1-2% by weight, a main crystalline phase of cordierite, an open porosity of not greater than 25% by volume and an average thermal expansion coefficient of not greater than $2.0 \times 10^{-6}$/°C. in a temperature range of 25°-800° C.

7. A method of producing a low expansion ceramic as defined in claim 6, further comprising heat treating the acid treated body at a temperature range of 1,150° C.—the firing temperature.

8. A method of producing a low expansion ceramic as defined in claim 6, wherein a $P_2O_5$ source material is selected from the group consisting of aluminum phosphate, magnesium phosphate, zinc phosphate and iron phosphate, and an MgO source material, $Al_2O_3$ source material and $SiO_2$ source material are selected from the group consisting of bluesite, magnesite, talc, clay, alumina and aluminum hydroxide.

9. A method of producing a low expansion ceramic as defined in claim 6, wherein an MgO source material has an average particle diameter of not greater than 5 $\mu$m.

10. A low expansion ceramic comprising: 8.0-20.5% by weight of MgO, 24.0-45.0% by weight of $Al_2O_3$, 40.5-61.0% by weight of $SiO_2$ and 0.1-2.0% by weight of $P_2O_5$, the amount of $P_2O_5$ remains in said low expansion ceramic after the $P_2O_5$ has been converted to $AlPO_4$ during firing and subsequent removal of the remaining $P_2O_5$ from the sintered body by acid leaching, a main crystal phase of cordierite phases, an open porosity of not greater than 25% by volume, and an average thermal expansion coefficient of not greater than $2.0 \times 10^{-6}$/°C. in a temperature range of 25°-800° C.

* * * * *